(12) United States Patent
Tyagi et al.

(10) Patent No.: US 9,501,692 B2
(45) Date of Patent: Nov. 22, 2016

(54) METHOD AND APPARATUS FOR PROJECTIVE VOLUME MONITORING

(71) Applicant: Omron Corporation, Kyoto-shi, Kyoto (JP)

(72) Inventors: Ambrish Tyagi, Palo Alto, CA (US); John Drinkard, Fremont, CA (US); Yoshiharu Tani, Kusatsu (JP); Koichi Kinoshita, Kyoto (JP)

(73) Assignee: Omron Corporation, Kyoto (JP)

( * ) Notice: Subject to any disclaimer, the term of this patent is extended or adjusted under 35 U.S.C. 154(b) by 918 days.

(21) Appl. No.: 13/650,461

(22) Filed: Oct. 12, 2012

(65) Prior Publication Data

US 2013/0094705 A1 Apr. 18, 2013

Related U.S. Application Data

(63) Continuation-in-part of application No. 13/541,399, filed on Jul. 3, 2012.

(60) Provisional application No. 61/547,251, filed on Oct. 14, 2011.

(51) Int. Cl.
| | |
|---|---|
| *G06K 9/00* | (2006.01) |
| *F16P 3/14* | (2006.01) |
| *G06T 7/00* | (2006.01) |

(52) U.S. Cl.
CPC ........... *G06K 9/00369* (2013.01); *F16P 3/144* (2013.01); *G06T 7/0022* (2013.01)

(58) Field of Classification Search
CPC ........... G06K 9/00369; G06K 9/6292; G06K 9/00805; G06K 9/00778; F16P 3/144; G06T 7/0022; G06T 7/0075; G06T 7/20; G06T 7/0077; G06T 2207/10021; G06T 2207/10012; B60R 21/0134; B60R 21/34; C07C 9/025; C07C 9/00; H04N 7/181
See application file for complete search history.

(56) References Cited

U.S. PATENT DOCUMENTS

| | | | |
|---|---|---|---|
| 5,625,408 A * | 4/1997 | Matsugu et al. | 348/42 |
| 6,177,958 B1 * | 1/2001 | Anderson | 348/362 |

(Continued)

FOREIGN PATENT DOCUMENTS

| | | |
|---|---|---|
| EP | 2275990 A1 | 1/2011 |
| GB | 2440826 A | 2/2008 |

(Continued)

OTHER PUBLICATIONS

Schraml, S. et al. "Dynamic Stereo Vision Systems for Real-time Tracking." IEEE International Symposium on Circuits and Systems, Paris, France, pp. 1409-1412, May 30, 2010.

(Continued)

*Primary Examiner* — Mohammed Jebari
(74) *Attorney, Agent, or Firm* — Murphy, Bilak & Homiller, PLLC

(57) ABSTRACT

According to one aspect of the teachings presented herein, a projective volume monitoring apparatus is configured to detect objects intruding into a monitoring zone. The projective volume monitoring apparatus is configured to detect the intrusion of objects of a minimum object size relative to a protection boundary, based on an advantageous processing technique that represents range pixels obtained from stereo correlation processing in spherical coordinates and maps those range pixels to a two-dimensional histogram that is defined over the projective coordinate space associated with capturing the stereo images used in correlation processing. The histogram quantizes the horizontal and vertical solid angle ranges of the projective coordinate space into a grid of cells. The apparatus flags range pixels that are within the protection boundary and accumulates them into corresponding cells of the histogram, and then performs clustering on the histogram cells to detect object intrusions.

31 Claims, 18 Drawing Sheets

(56) References Cited

U.S. PATENT DOCUMENTS

| | | | |
|---|---|---|---|
| 6,487,303 | B1 | 11/2002 | Yamaguchi et al. |
| 6,829,371 | B1* | 12/2004 | Nichani et al. ............... 382/103 |
| 8,933,593 | B2* | 1/2015 | Haberer et al. ............... 307/326 |
| 2003/0095186 | A1* | 5/2003 | Aman et al. .................. 348/162 |
| 2004/0045339 | A1* | 3/2004 | Nichani et al. ................ 73/1.01 |
| 2004/0218784 | A1* | 11/2004 | Nichani et al. ............... 382/103 |
| 2005/0093697 | A1 | 5/2005 | Nichani et al. |
| 2005/0232487 | A1* | 10/2005 | Fleisher ........................ 382/181 |
| 2007/0296815 | A1 | 12/2007 | Isaksson et al. |
| 2008/0043106 | A1* | 2/2008 | Hassapis et al. ............. 348/153 |
| 2008/0273751 | A1* | 11/2008 | Yuan et al. ................... 382/103 |
| 2010/0208104 | A1* | 8/2010 | Imagawa et al. ............. 348/234 |
| 2011/0001799 | A1* | 1/2011 | Rothenberger et al. ........ 348/47 |
| 2011/0211068 | A1 | 9/2011 | Yokota |
| 2012/0025989 | A1* | 2/2012 | Cuddihy et al. ........... 340/573.1 |
| 2012/0051598 | A1* | 3/2012 | Ikeda ........................... 382/103 |
| 2012/0074296 | A1* | 3/2012 | Hammes et al. ............. 250/205 |

FOREIGN PATENT DOCUMENTS

| | | |
|---|---|---|
| WO | 2006/014974 A1 | 2/2006 |
| WO | 2008061607 A1 | 5/2008 |

OTHER PUBLICATIONS

Kang, S.B. et al. "A Multibaseline Stereo System with Active illumination and Real-time Image Acquisition." Proceedings of the Fifth International Conference on Computer Vision, Jun. 20-23, 1995, pp. 88-93, Cambridge, MA, USA.

Mueller, M. et al. "Spatio-Temporal Consistent Depth Maps from Multi-View Video." 3DTV Conference: The True Vision—Capture, Transmission and Display of 3D Video, May 16-18, 2011, pp. 1-4, Antalya, Turkey.

Ober, A. et al. "A Safe Fault Tolerant Multi-View Approach for Vision-Based Protective Devices." Seventh IEEE International Conference on Advanced Video and Signal Based Surveillance, Aug. 29-Sep. 1, 2010, pp. 17-25, Boston, MA, USA.

Okutomi, M. et al. "A Multiple-Baseline Stereo." IEEE Transactions on Pattern Analysis and Machine Intelligence, Apr. 1993, pp. 353-363, vol. 15, Issue No. 4.

\* cited by examiner

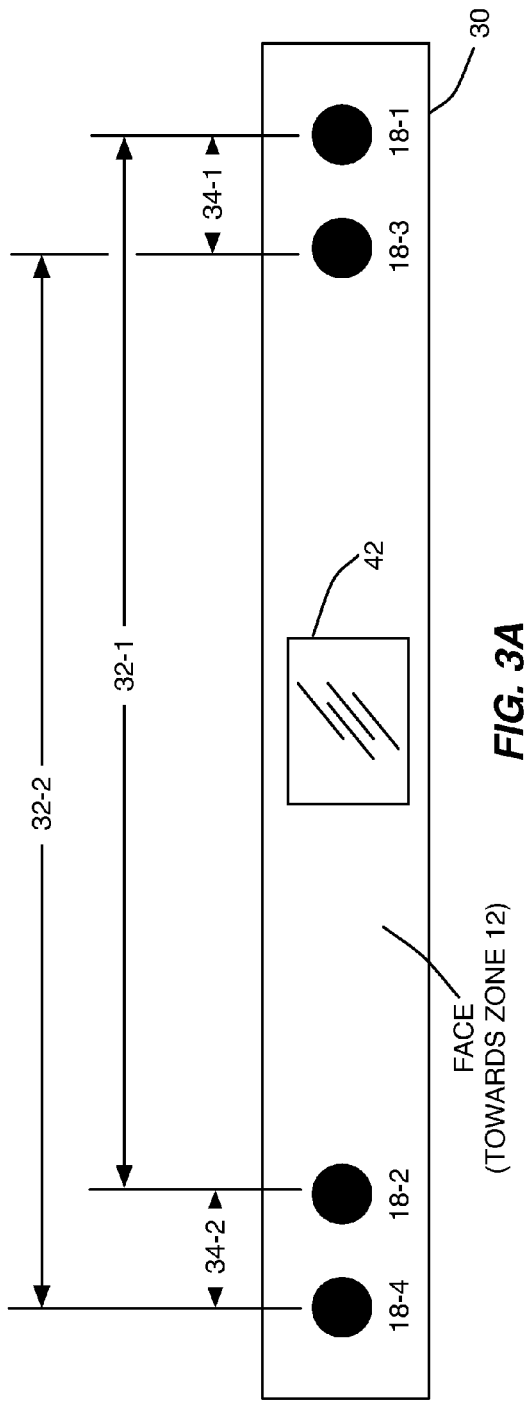
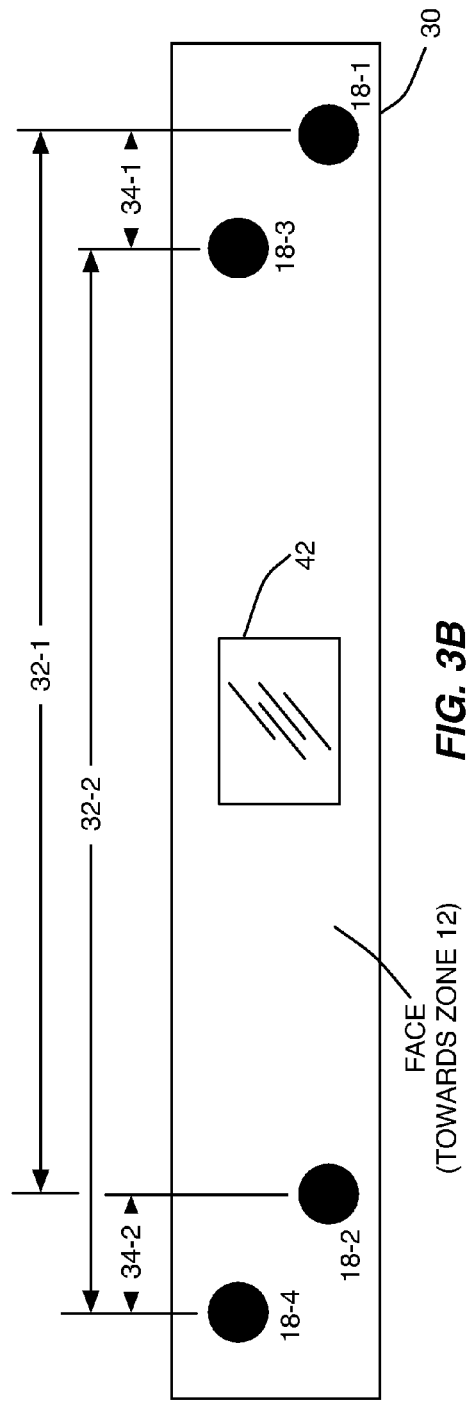
FIG. 3A
FIG. 3B

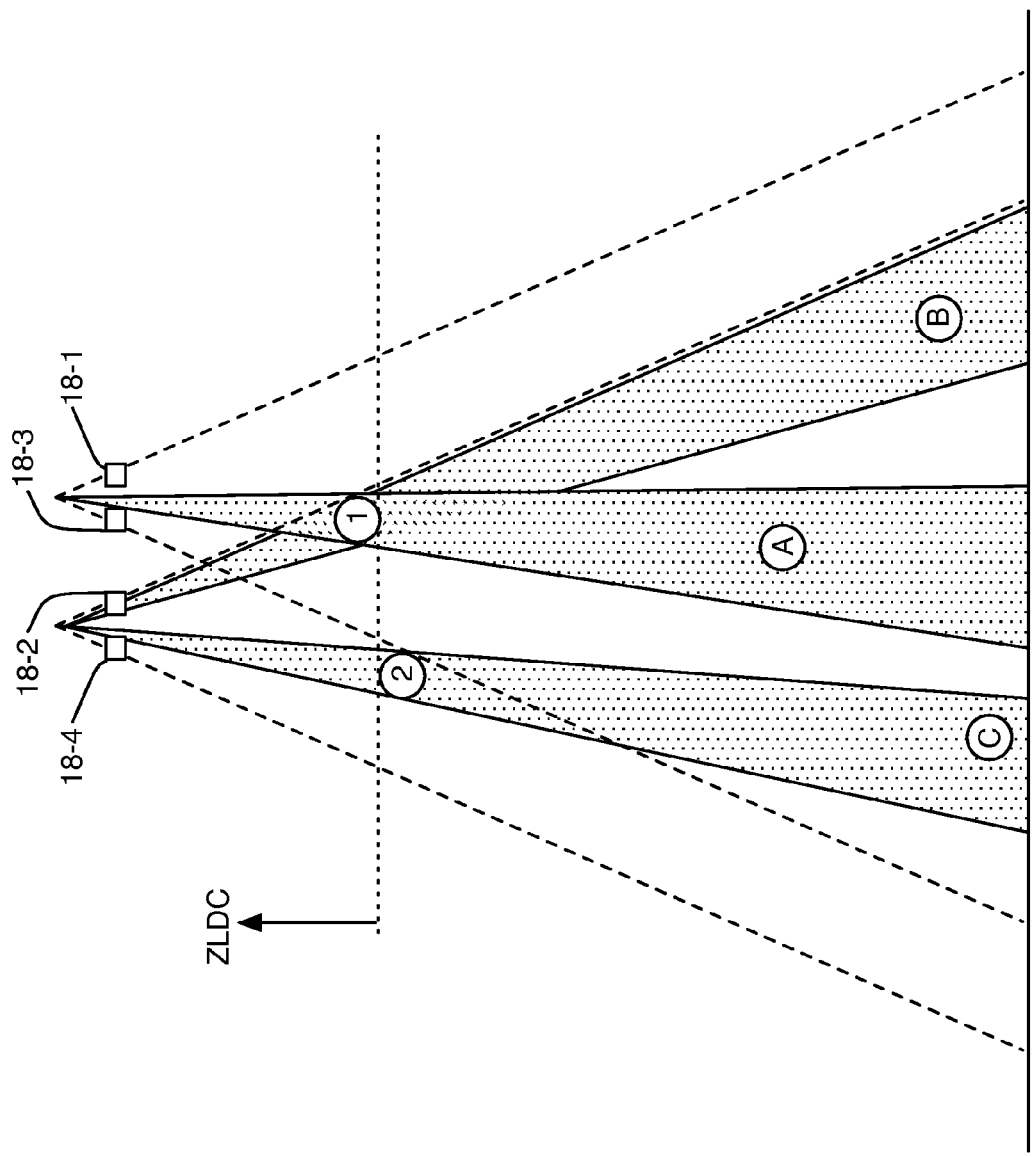

METHOD AND APPARATUS FOR PROJECTIVE VOLUME MONITORING

RELATED APPLICATIONS

This application claims priority under 35 U.S.C. §119(e) from the U.S. provisional application filed on 14 Oct. 2011 and assigned Application No. 61/547,251, and under 35 U.S.C. §120 as a continuation-in-part from the U.S. utility patent application filed on 3 Jul. 2012 and assigned application Ser. No. 13/541,399, both of which applications are incorporated herein by reference.

TECHNICAL FIELD

The present invention generally relates to machine vision and particularly relates to projective volume monitoring, such as used for machine guarding or other object intrusion detection contexts.

BACKGROUND

Machine vision systems find use in a variety of applications, with area monitoring representing a prime example. Monitoring for the intrusion of objects into a defined zone or volume represents a key aspect of "guarding" applications, such as hazardous machine guarding. In the context of machine guarding, various approaches are known, such as the use of physical barriers, interlock systems, safety mats, light curtains, and time-of-flight laser scanner monitoring.

While machine vision systems may be used as a complement to, or in conjunction with one or more of the above approaches to machine guarding, they also represent an arguably better and more flexible solution to area guarding. Among their several advantages, machine vision systems can monitor three-dimensional boundaries around machines with complex spatial movements, where planar light-curtain boundaries might be impractical or prohibitively complex to configure safely, or where such protective equipment would impede machine operation.

On the other hand, ensuring proper operation of a machine vision system is challenging, particularly in safety-critical applications with regard to dynamic, ongoing verification of minimum detection capabilities and maximum (object) detection response times. These kinds of verifications, along with ensuring failsafe fault detection, impose significant challenges when using machine vision systems for hazardous machine guarding and other safety critical applications.

SUMMARY

According to one aspect of the teachings presented herein, a projective volume monitoring apparatus is configured to detect objects intruding into a monitoring zone. The projective volume monitoring apparatus is configured to detect the intrusion of objects of a minimum object size relative to a protection boundary, based on an advantageous processing technique that represents range pixels obtained from stereo correlation processing in spherical coordinates and maps those range pixels to a two-dimensional histogram that is defined over the projective coordinate space associated with capturing the stereo images used in correlation processing. The histogram quantizes the horizontal and vertical solid angle ranges of the projective coordinate space into a grid of cells. The apparatus flags range pixels that are within the protection boundary and accumulates them into corresponding cells of this histogram, and then performs clustering on the histogram cells to detect object intrusions.

In more detail, the projective monitoring apparatus includes image sensors configured to capture stereo images, e.g., over succeeding image frames, and further includes image processing circuits operatively associated with the image sensors. The image processing circuits are configured to generate a depth map of range pixels in spherical coordinates based on correlation processing of a stereo image, to correlate the stereo images to obtain depth maps comprising "range" pixels represented in three-dimensional Cartesian coordinates, and to convert the range pixels into spherical coordinates. Thus, each range pixel is represented as a radial distance along a respective pixel ray and a corresponding pair of solid angle values within the horizontal and vertical fields of view associated with capturing the stereo image.

The image processing circuits are further configured to obtain a set of flagged pixels by flagging those range pixels that fall within a protection boundary defined for the monitoring zone, and to accumulate the flagged pixels into corresponding cells of a two-dimensional histogram that quantizes the solid angle ranges of the horizontal and vertical fields of view. Further, image processing circuits are configured to cluster cells in the histogram to detect intrusions of objects within the protection boundary that meet a minimum object size threshold.

Additionally, in at least one embodiment, the image processing circuits are configured to determine whether any qualified clusters persist for a defined window of time and, if so, determine that an object intrusion has occurred. For example, the image processing circuits are configured to determine whether the same qualified cluster, or equivalent qualified clusters, persists over some number of succeeding image frames.

In the same or another embodiment, the image processing circuits are configured to generate one or more sets of mitigation pixels from the stereo image, wherein the mitigation pixels represent pixels in the stereo image that are flagged as being faulty or unreliable. Correspondingly, the image processing circuits are configured to integrate the one or more sets of mitigation pixels into the set of flagged pixels for use in clustering. Thus, any given qualified cluster detected during clustering comprises range pixels flagged based on range detection processing or mitigation pixels flagged based on fault detection processing, or a mixture of both. Such an approach advantageously addresses the need for safety-critical fault detection by treating mitigation pixels like flagged range pixels, for purposes of detecting object intrusions Of course, the present invention is not limited to the above features and advantages. Indeed, those skilled in the art will recognize additional features and advantages upon reading the following detailed description, and upon viewing the accompanying drawings.

BRIEF DESCRIPTION OF THE DRAWINGS

FIGS. 3A-3C are block diagrams of example geometric arrangements for establishing primary- and secondary-baseline pairs among a set of four image sensors in a sensor unit.

FIGS. 7A and 7B are diagrams illustrating a Zone of Limited Detection Capability (ZLDC) that is inside a minimum detection distance specified for a projective volume monitoring apparatus, and further illustrating a Zone of Side Shadowing (ZSS) on either side of a primary monitoring zone.

DETAILED DESCRIPTION

Figure 1:
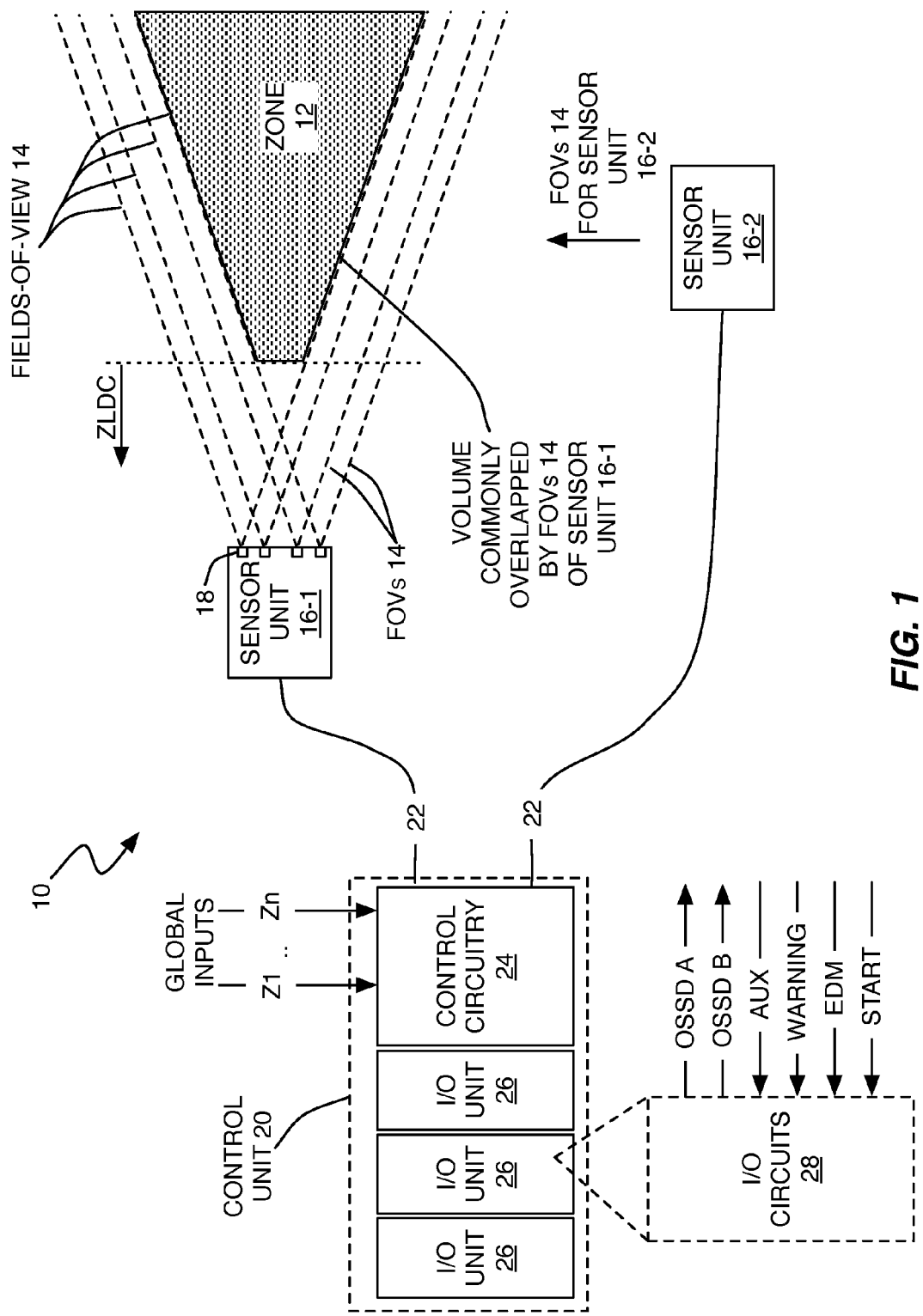
FIG. 1 is a block diagram of one embodiment of a projective volume monitoring apparatus that includes a control unit and one or more sensor units.

FIG. 1 illustrates an example embodiment of a projective volume monitoring apparatus 10, which provides image-based monitoring of a primary monitoring zone 12 that comprises a three-dimensional spatial volume containing, for example, one or more items of hazardous machinery (not shown in the illustration). The projective volume monitoring apparatus 10 (hereafter, "apparatus 10") operates as an image-based monitoring system, e.g., for safeguarding against the intrusion of people or other objects into the primary monitoring zone 12.

Note that the limits of the zone 12 are defined by the common overlap of associated sensor fields-of-view 14, which are explained in more detail later. Broadly, the apparatus 10 is configured to use image processing and stereo vision techniques to detect the intrusion of persons or objects into a guarded three-dimensional (3D) zone, which may also be referred to as a guarded "area." Typical applications include, without limitation, area monitoring and perimeter guarding. In an area-monitoring example, a frequently accessed area is partially bounded by hard guards with an entry point that is guarded by a light curtain or other mechanism, and the apparatus 10 acts as a secondary guard system. Similarly, in a perimeter-guarding example, the apparatus 10 monitors an infrequently accessed and unguarded area.

Of course, the apparatus 10 may fulfill both roles simultaneously, or switch between modes with changing contexts. Also, it will be understood that the apparatus 10 may include signaling connections to the involved machinery or their power systems and/or may have connections to factory-control networks, etc.

To complement a wide range of intended uses, the apparatus 10 includes, in the illustrated example embodiment, one or more sensor units 16. Each sensor unit 16, also referred to as a "sensor head," includes a plurality of image sensors 18. The image sensors 18 are fixed within a body or housing of the sensor unit 16, such that all of the fields-of-view (FOV) 14 commonly overlap to define the primary monitoring zone 12 as a 3D region. Of course, as will be explained later, the apparatus 10 in one or more embodiments permits a user to configure monitoring multiple zones or 3D boundaries within the primary monitoring zone 12, e.g., to configure safety-critical and/or warning zones based on 3D ranges within the primary monitoring zone 12.

Each one of the sensor units 16 connects to a control unit 20 via a cable or other link 22. In one embodiment, the link(s) 22 are "PoE" (Power-over-Ethernet) links that supply electric power to the sensor units 16 and provide for communication or other signaling between the sensor units 16 and the control unit 20. The sensor units 16 and the control unit 20 operate together for sensing objects in the zone 12 (or within some configured sub-region of the zone 12). In at least one embodiment, each sensor unit 16 performs its monitoring functions independently from the other sensor units 16 and communicates its monitoring status to the control unit 20 over a safe Ethernet connection, or other link 22. In turn, the control unit 20 processes the monitoring status from each connected sensor unit 16 and uses this information to control machinery according to configurable safety inputs and outputs.

For example, in the illustrated embodiment, the control unit 20 includes control circuitry 24, e.g., one or more microprocessors, DSPs, ASICs, FPGAs, or other digital processing circuitry. In at least one embodiment, the control circuitry 24 includes memory or another computer-readable medium that stores a computer program, the execution of which by a digital processor in the control circuit 24, at least in part, configures the control unit 20 according to the teachings herein.

The control unit 20 further includes certain Input/Output (I/O) circuitry, which may be arranged in modular fashion, e.g., in a modular I/O unit 26. The I/O units 26 may comprise like circuitry, or given I/O units 26 may be intended for given types of interface signals, e.g., one for network communications, one for certain types of control signaling, etc. For machine-guarding applications, at least one of the I/O units 26 is configured for machine-safety control and includes I/O circuits 28 that provide safety-relay outputs (OSSD A, OS SD B) for disabling or otherwise stopping a hazardous machine responsive to object intrusions detected by the sensor unit(s) 16. The same circuitry also may provide for mode-control and activation signals (START, AUX, etc.). Further, the control unit itself may offer a range of "global" I/O, for communications, status signaling, etc.

Figure 2:
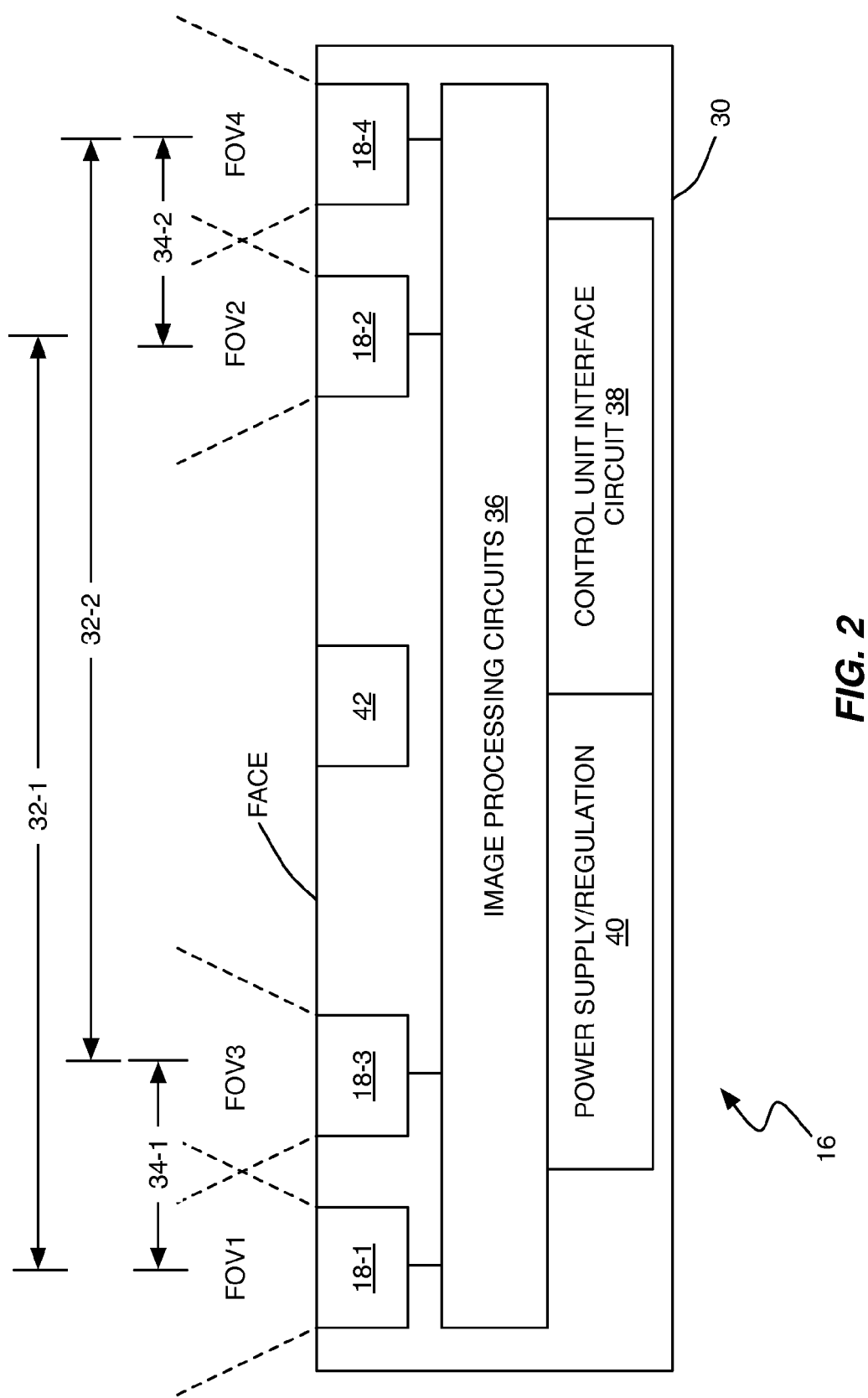
FIG. 2 is a block diagram of one embodiment of a sensor unit.

In terms of its object detection functionality, the apparatus 10 relies primarily on stereoscopic techniques to find the 3D position of objects present in its (common) field-of-view. To this end, FIG. 2 illustrates an example sensor unit 16 that includes four image sensors 18, individually numbered here for clarity of reference as image sensors 18-1, 18-2, 18-3, and 18-4. The fields-of-view 14 of the individual image sensors 18 within a sensor unit 16 are all partially overlapping and the region commonly overlapped by all fields-of-view 14 defines the earlier-introduced primary monitoring zone 12.

A body or housing 30 fixes the individual image sensors 18 in a spaced apart arrangement that defines multiple "baselines." Here, the term "baseline" defines the separation distance between a pairing of image sensors 18 used to acquire image pairs. In the illustrated arrangement, one sees two "long" baselines and two "short" baselines—here, the terms "long" and "short" are used in a relative sense. The long baselines include a first primary baseline 32-1 defined by the separation distance between a first pair of the image sensors 18, where that first pair includes the image sensors 18-1 and 18-2, and further include a second primary baseline 32-2 defined by the separation distance between a second pair of the image sensors 18, where that second pair includes the image sensors 18-3 and 18-4.

Similarly, the short baselines include a first secondary baseline 34-1 defined by the separation distance between a third pair of the image sensors 18, where that third pair includes the image sensors 18-1 and 18-3, and further include a second secondary baseline 34-2 defined by the separation distance between a fourth pair of the image sensors 18, where that fourth pair includes the image sensors 18-2 and 18-4. In this regard, it will be understood that different combinations of the same set of four image sensors 18 are operated as different pairings of image sensors 18, wherein those pairings may differ in terms of their associated baselines and/or how they are used.

Figure 3C:
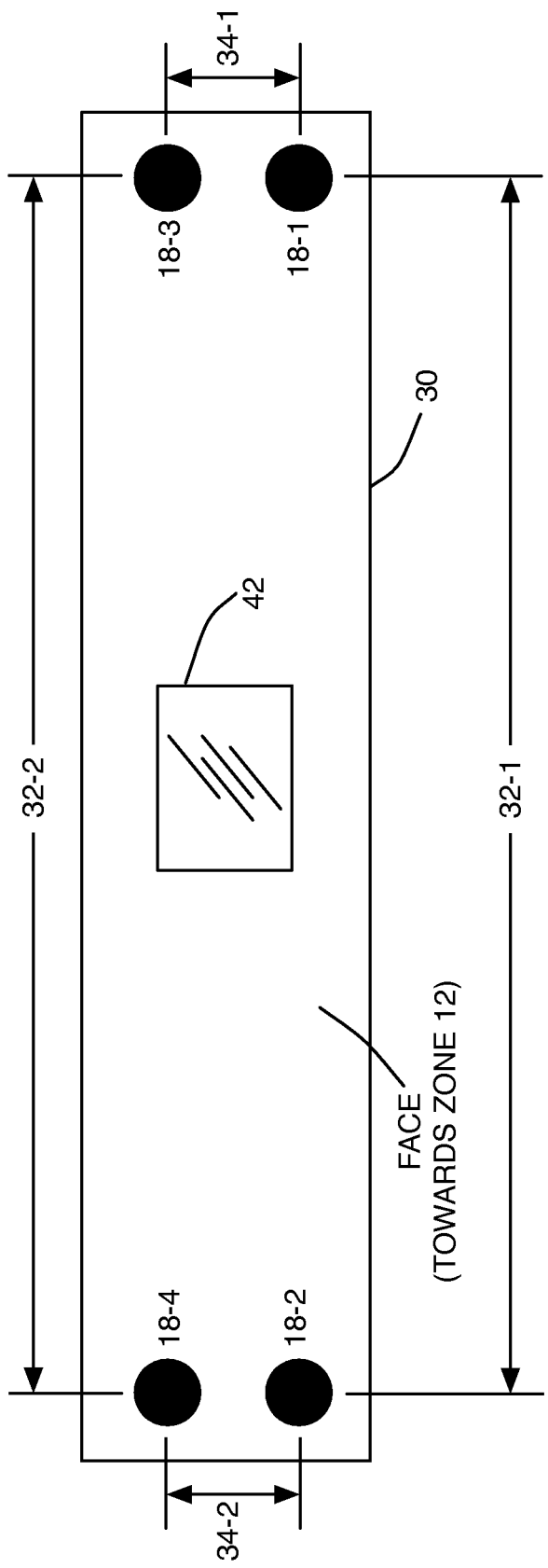

The first and second primary baselines 32-1 and 32-2 may be co-equal, or may be different lengths. Likewise, the first and second secondary baselines 34-1 and 34-2 may be co-equal, or may be different lengths. While not limiting, in an example case, the shortest primary baseline 32 is more than twice as long as the longest secondary baseline 34. As another point of flexibility, other geometric arrangements can be used to obtain a distribution of the four image sensors 18, for operation as primary and secondary baseline pairs. See FIGS. 3A-3C, illustrating example geometric arrangements of image sensors 18 in a given sensor unit 16.

Apart from the physical arrangement needed to establish the primary and secondary baseline pairs, it should be understood that the sensor unit 16 is itself configured to logically operate the image sensors 18 in accordance with the baseline pairing definitions, so that it processes the image pairs in accordance with those definitions. In this regard, and with reference again to the example shown in FIG. 2, the sensor unit 16 includes one or more image processing circuits 36, which are configured to acquire image data from respective ones of the image sensors 18, process the image data, and respond to the results of such processing, e.g., notifying the control unit 20 of detected object intrusions, etc.

The sensor unit 16 further includes control unit interface circuits 38, a power supply/regulation circuit 40, and, optionally, a textured light source 42. Here, the textured light source 42 provides a mechanism for the sensor unit 16 to project patterned light into the primary monitoring zone 12, or more generally into the fields-of-view 14 of its included image sensors 18.

The term "texture" as used here refers to local variations in image contrast within the field-of-view of any given image sensor 18. The textured light source 42 may be integrated within each sensor unit 16, or may be separately powered and located in close proximity with the sensor units 16. In either case, incorporating a source of artificial texture into the apparatus 10 offers the advantage of adding synthetic texture to low-texture regions in the field-of-view 14 of any given image sensor 18. That is, regions without sufficient natural texture to support 3D ranging can be illuminated with synthetically added scene texture provided by the texture light source 42, for accurate and complete 3D ranging within the sensor field-of-view 14.

The image processing circuits 36 comprise, for example, one or more microprocessors, DSPs, FPGAs, ASICs, or other digital processing circuitry. In at least one embodiment, the image processing circuits 36 include memory or another computer-readable medium that stores computer program instructions, the execution of which at least partially configures the sensor unit 16 to perform the image processing and other operations disclosed herein. Of course, other arrangements are contemplated, such as where certain portions of the image processing and 3D analysis are performed in hardware (e.g., FPGAs) and certain other portions are performed in one or more microprocessors.

With the above baseline arrangements in mind, the apparatus 10 can be understood as comprising at least one sensor unit 16 that includes (at least) four image sensors 18 having respective sensor fields-of-view 14 that all overlap a primary monitoring zone 12 and arranged so that first and second image sensors 18-1 and 18-2 form a first primary-baseline pair whose spacing defines a first primary baseline 32-1, third and fourth image sensors 18-3 and 18-4 form a second primary-baseline pair whose spacing defines a second primary baseline 32-2.

As shown, the image sensors 18 are further arranged so that the first and third image sensors 18-1 and 18-3 form a first secondary-baseline pair whose spacing defines a first secondary baseline 34-1, and the second and fourth imaging sensors 18-2 and 18-4 form a second secondary-baseline pair whose spacing defines a second secondary baseline 34-2. The primary baselines 32 are longer than the secondary baselines 34.

The sensor unit 16 further includes image processing circuits 36 configured to redundantly detect objects within the primary monitoring zone 12 using image data acquired from the primary-baseline pairs, and further configured to detect shadowing objects using image data acquired from the secondary-baseline pairs. That is, the image processing circuits 36 of the sensor unit 16 are configured to redundantly detect objects within the primary monitoring zone 12 by detecting the presence of such objects in range data derived via stereoscopic image processing of the image data acquired by the first primary-baseline pair, or in range data derived via stereoscopic image processing of the image data acquired by the second primary-baseline pair.

Thus, objects will be detected if they are discerned from the (3D) range data obtained from stereoscopically processing image pairs obtained from the image sensors 18-1 and 18-2 and/or if such objects are discerned from the (3D) range data obtained from stereoscopically processing image pairs obtained from the image sensors 18-3 and 18-4. In that regard, the first and second image sensors 18-1 and 18-2 may be regarded as a first "stereo pair," and the image correction and stereoscopic processing applied to the image pairs acquired from the first and second image sensors 18-1 and 18-2 may be regarded as a first stereo "channel."

Likewise, the third and fourth image sensors 18-3 and 18-4 are regarded as a second stereo pair, and the image processing and stereoscopic processing applied to the image pairs acquired from the third and fourth image sensors 18-3 and 18-4 may be regarded as a second stereo channel, which is independent from the first stereo channel. Hence, the two stereo channels provide redundant object detection within the primary monitoring zone 12.

Here, it may be noted that the primary monitoring zone 12 is bounded by a minimum detection distance representing a minimum range from the sensor unit 16 at which the sensor unit 16 detects objects using the primary-baseline pairs. As a further advantage, in addition to the reliability and safety of using redundant object detection via the primary-baseline pairs, the secondary baseline pairs are used to detect shadowing objects. That is, the logical pairing and processing of image data from the image sensors 18-1 and 18-3 as the first secondary-baseline pair, and from the image sensors 18-2 and 18-4 as the second secondary-baseline pair, are used to detect objects that are within the minimum detection distance and/or not within all four sensor fields-of-view 14.

Broadly, a "shadowing object" obstructs one or more of the sensor fields-of-view 14 with respect to the primary monitoring zone 12. In at least one embodiment, the image processing circuits 36 of the sensor unit 16 are configured to detect shadowing objects by, for each secondary-baseline pair, detecting intensity differences between the image data acquired by the image sensors 18 in the secondary-baseline pair, or by evaluating range data generated from stereoscopic image processing of the image data acquired by the image sensors 18 in the secondary-baseline pair.

Shadowing object detection addresses a number of potentially hazardous conditions, including these items: manual interference, where small objects in the ZLDC or ZSS will not be detected by stereovision and can shadow objects into the primary monitoring zone 12; spot pollution, where pollution on optical surfaces is not detected by stereovision and can shadow objects into the primary monitoring zone 12; ghosting, where intense directional lights can result in multiple internal reflections on an image sensor 18, which degrades contrast and may result in a deterioration of detection capability; glare, where the optical surfaces of an image sensor 18 have slight contamination, directional lights can result in glare, which degrades contrast and may result in a deterioration of detection capability; and sensitivity changes, where changes in the individual pixel sensitivities in an image sensor 18 may result in a deterioration of detection capability.

Figure 8:
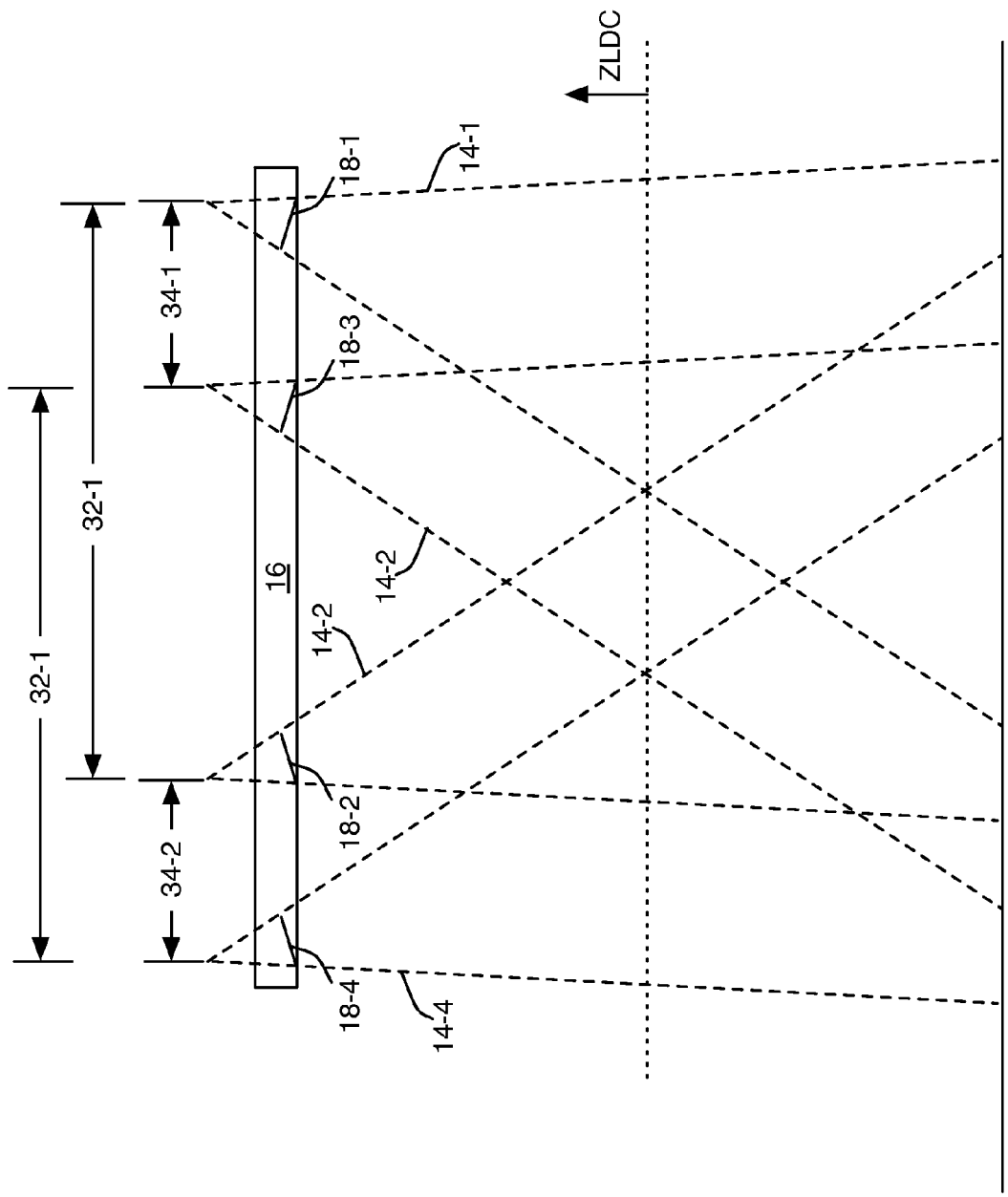
FIG. 8 is a diagram of an example configuration for a sensor unit, including its image sensors and their respective fields-of-view.

Referring momentarily to FIG. 8, the existence of verging angles between the left and right side image sensors 18 in a primary-baseline pair impose a final configuration such as the one depicted. These verging angles provide a basis for shadowing object detection, wherein, in an example configuration, the image processing circuits 36 perform shadowing object detection within the ZLDC, based on looking for significant differences in intensity between the images acquired from one image sensor 18 in a given secondary-baseline pair, as compared to corresponding images acquired from the other image sensor 18 in that same secondary-baseline pair. Significant intensity differences signal the presence of close-by objects, because, for such a small baseline, more distant objects will cause very small disparities.

The basic image intensity difference is calculated by analyzing each pixel on one of the images (Image1) in the relevant pair of images, and searching over a given search window for an intensity match, within some threshold (th), on the other image (Image2). If there is no match, it means that the pixel belongs to something closer than a certain range because its disparity is greater than the search window size and the pixel is flagged as 'different'. The image difference is therefore binary.

Because image differences due to a shadowing object are based on the disparity introduced in image pairs acquired using one of the secondary baselines 34-1 or 34-2, if an object were to align with the baseline and go through-and-through the protected zone it would result in no differences found. An additional through-and-through object detection algorithm that is based in quasi-horizontal line detection is also used, to detect objects within those angles not reliably detected by the basic image difference algorithm, e.g., +/−fifteen degrees.

Further, if a shadowing object is big and/or very close (for example if it covers the whole field-of-view 14 of an image sensor 18) it may not even provide a detectable horizontal line. However, this situation is detected using reference marker-based mitigations, because apparatus configuration requirements in one or more embodiments require that at least one reference marker must be visible within the primary monitoring zone 12 during a setup/verification phase.

As for detecting objects that are beyond the ZLDC but outside the primary monitoring zone 12, the verging angles of the image sensors 18 may be configured so as to essentially eliminate the ZSSs on either side of the primary monitoring zone 12. Additionally, or alternatively, the image processing circuits 36 use a short-range stereovision approach to object detection, wherein the secondary-baseline pairs are used to detect objects over a very limited portion of the field of view, only at the appropriate image borders.

Also, as previously noted, in some embodiments, the image sensors 18 in each sensor unit 16 are configured to acquire image frames, including high-exposure image frames and low-exposure image frames. For example, the image processing circuits 36 are configured to dynamically control the exposure times of the individual image sensors 18, so that image acquisition varies between the use of longer and shorter exposure times. Further, the image processing circuits 36 are configured, at least with respect to the image frames acquired by the primary baseline pairs, to fuse corresponding high- and low-exposure image frames to obtain high dynamic range (HDR) images, and to stereoscopically process streams of said HDR images from each of the primary-baseline pairs, for redundant detection of objects in the primary monitoring zone 12.

For example, the image sensor 18-1 is controlled to generate a low-exposure image frame and a subsequent high-exposure image frame, and those two frames are combined to obtain a first HDR image. In general, two or more different exposure frames can be combined to generate HDR images. This process repeats over successive acquisition intervals, thus resulting in a stream of first HDR images. During the same acquisition intervals, the image sensor 18-2 is controlled to generate low- and high-exposure image frames, which are combined to make a stream of second HDR images. The first and second HDR images from any given acquisition interval form a corresponding HDR image pair, which are stereoscopically processed (possibly after further pre-processing in advance of stereoscopic processing). A similar stream of HDR image pairs in the other stereo channel are obtained via the second primary-baseline pair (i.e., image sensors 18-3 and 18-4).

Additional image pre-processing may be done, as well. For example, in some embodiments, the HDR image pairs from each stereo channel are rectified so that they correspond to an epipolar geometry where corresponding optical axes in the image sensors included in the primary-baseline pair are parallel and where the epipolar lines are corresponding image rows in the rectified images.

The HDR image pairs from both stereo channels are rectified and then processed by a stereo vision processor circuit included in the image processing circuits 36. The stereo vision processor circuit is configured to perform a stereo correspondence algorithm that computes the disparity between corresponding scene points in the rectified images obtained by the image sensors 18 in each stereo channel and, based on said disparity, calculates the 3D position of the scene points with respect to a position of the image sensors 18.

In more detail, an example sensor unit 16 contains four image sensors 18 that are grouped into two stereo channels, with one channel represented by the first primary-baseline pair comprising the image sensors 18-1 and 18-2, separated by a first distance referred to as the first primary baseline 32-1, and with the other channel represented by the second primary-baseline pair comprising the image sensors 18-3 and 18-4, separated by a second distance referred to as the second primary baseline 32-2.

Multiple raw images from each image sensor 18 are composed together to generate high dynamic range images of the scene captured by the field-of-view 14 of the image sensor 18. The high dynamic range images for each stereo channel are rectified such that they correspond to an epipolar geometry where the corresponding optical axes are parallel, and the epipolar lines are the corresponding image rows. The rectified images are processed by the aforementioned stereo vision processor circuit, which executes a stereo correspondence algorithm to compute the disparity between corresponding scene points, and hence calculate the 3D position of those points with respect to the given position of the sensor unit 16.

In that regard, the primary monitoring zone 12 is a 3D projective volume limited by the common field-of-view (FOV) of the image sensors 18. The maximum size of the disparity search window limits the shortest distance measurable by the stereo setup, thus limiting the shortest allowable range of the primary monitoring zone 12. This distance is also referred to as the "Zone of Limited Detection Capability" (ZLDC). Similarly, the maximum distance included within the primary monitoring zone 12 is limited by the error tolerance imposed on the apparatus 10.

Images from the primary-baseline pairs are processed to generate a cloud of 3D points for the primary monitoring zone 12, corresponding to 3D points on the surfaces of objects within the primary monitoring zone 12. This 3D point cloud is further analyzed through data compression, clustering and segmentation algorithms, to determine whether or not an object of a defined minimum size has entered the primary monitoring zone 12. Of course, the primary monitoring zone 12, through configuration of the processing logic of the apparatus 10, may include different levels of alerts and number and type of monitoring zones, including non-safety critical warning zones and safety-critical protection zones.

In the example distributed architecture shown in FIG. 1, the control unit 20 processes intrusion signals from one or more sensor units 16 and correspondingly controls one or more machines, e.g., hazardous machines in the primary monitoring zone 12, or provides other signaling or status information regarding intrusions detected by the sensor units 16. While the control unit 20 also may provide power to the sensor units 16 through the communication links 22 between it and the sensor units 16, the sensor units 16 also may have separate power inputs, e.g., in case the user does not wish to employ PoE connections. Further, while not shown, an "endspan" unit may be connected as an intermediary between the control unit 20 and given ones of the sensor units 16, to provide for localized powering of the sensor units 16, I/O expansion, etc.

Whether an endspan unit is incorporated into the apparatus, some embodiments of the control unit 20 are configured to support "zone selection," wherein the data or signal pattern applied to a set of "ZONE SELECT" inputs of the control unit 20 dynamically control the 3D boundaries monitored by the sensor units 16 during runtime of the apparatus 10. The monitored zones are set up during a configuration process for the apparatus 10. All the zones configured for monitoring by a particular sensor unit 16 are monitored simultaneously, and the control unit 20 associates intrusion status from the sensor unit 16 to selected I/O units 26 in the control unit 20. The mapping between sensor units 16 and their zone or zones and particular I/O units 26 in the control unit 20 is defined during the configuration process. Further, the control unit 20 may provide a global RESET signal input that enables a full system reset for recovery from control unit fault conditions.

Because of their use in safety-critical monitoring applications, the sensor units 16 in one or more embodiments incorporate a range of safety-of-design features. For example, the basic requirements for a Type 3 safety device according to IEC 61496-3 include these items: (1) no single failure may cause the product to fail in an unsafe way—such faults must be prevented or detected and responded to within the specified detection response time of the system; and (2) accumulated failures may not cause the product to fail in an unsafe way—background testing is needed to prevent the accumulation of failures leading to a safety-critical fault.

The dual stereo channels used to detect objects in the primary monitoring zone 12 address the single-failure requirements, based on comparing the processing results from the two channels for agreement. A discrepancy between the two channels indicates a malfunction in one or both of the channels. By checking for such discrepancies within the detection response time of the apparatus 10, the apparatus 10 can immediately go into a safe error condition. Alternatively, a more conservative approach to object detection could also be taken, where detection results from either primary-baseline pair can trigger a machine stop to keep the primary monitoring zone 12 safe. If the disagreement between the two primary-baseline pairs persists over a longer period (e.g., seconds to minutes) then malfunction could be detected, and the apparatus 10 could go into a safe error (fault) condition.

Additional dynamic fault-detection and self-diagnostic operations may be incorporated into the apparatus 10. For example, in some embodiments, the image processing circuits 36 of the sensor unit 16 include a single stereo vision processing circuit that is configured to perform stereoscopic processing of the image pairs obtained from both stereo channels—i.e., the image pairs acquired from the first primary-baseline pair of image sensors 18-1 and 18-2, and the image pairs acquired from the second primary-baseline pair of image sensors 18-3 and 18-4. The stereos vision processing circuit or "SVP" is, for example, an ASIC or other digital signal processor that performs stereo-vision image processing tasks at high speed.

Fault conditions in the SVP are detected using a special test frame, which is injected into the SVP once per response time cycle. The SVP output corresponding to the test input is compared against the expected result. The test frames are specially constructed to test all safety critical internal functions of the SVP.

The SVP and/or the image processing circuits 36 may incorporate other mitigations, as well. For example, the image processing circuits 36 identify "bad" pixels in the image sensors 18 using both raw and rectified images. The image processing circuits 36 use raw images, as acquired from the image sensors 18, to identify noisy, stuck, or low-sensitivity pixels, and run related bad pixel testing in the background. Test image frames may be used for bad pixel detection, where three types of test image frames are contemplated: (a) a Low-Integration Test Frame (LITF), which is an image capture corresponding to a very low integration time that produces average pixel intensities that are very close to the dark noise level when the sensor unit 16 is operated in typical lighting conditions; (b) a High Integration Test Frame (HITF), which is an image capture that corresponds to one of at least three different exposure intervals; (c) a Digital Test Pattern Frame (DTPF), which is a test pattern injected into the circuitry used to acquire image frames from the image sensors 18. One test image of each type may be captured per response time cycle. In this way, many test images of each type may be gathered and analyzed over the course of the specified background testing cycle (minutes to hours).

Further mitigations include: (a) Noisy Pixel Detection, in which a time series variance of pixel data using a set of many LITF is compared against a maximum threshold; (b) Stuck Pixels Detection (High or Low), where the same time series variance of pixel data using a set of many LITF and HITF is compared against a minimum threshold; (c) Low Sensitivity Pixel Detection, where measured response of pixel intensity is compared against the expected response for HITF at several exposure levels; (d) Bad Pixel Addressing Detection, where image processing of a known digital test pattern is compared against the expected result, to check proper operation of the image processing circuitry; (e) Bad Pixels Identified from Rectified Images, where saturated, under-saturated, and shadowed pixels, along with pixels deemed inappropriate for accurate correlation fall into this category—such testing can be performed once per frame, using run-time image data; (f) Dynamic Range Testing, where pixels are compared against high and low thresholds corresponding to a proper dynamic range of the image sensors 18.

Figure 4:
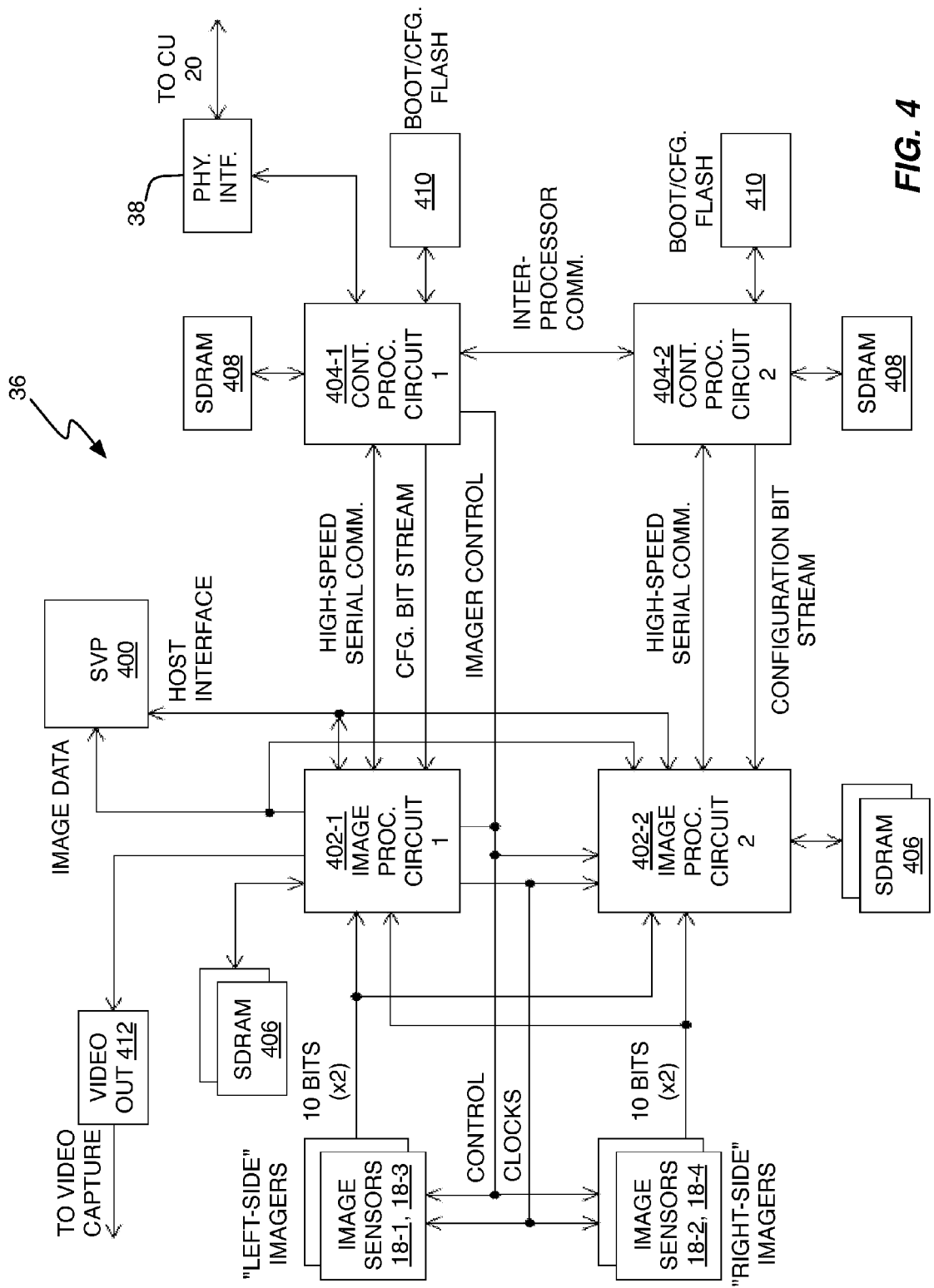
FIG. 4 is a block diagram of one embodiment of image processing circuits in an example sensor unit.

The above functionality is implemented, for example, using a mix of hardware and software-based circuit configurations, such as shown in FIG. 4, for one embodiment of the image processing circuits 36 of the sensor unit 16. One sees the aforementioned SVP, identified here as SVP 400, along with multiple, cross-connected processor circuits, e.g., the image processor circuits 402-1 and 402-2 ("image processors), and the control processor circuits 404-1 and 404-2 ("control processors"). In a non-limiting example, the image processors 402-1 and 402-2 are FPGAs, and the control processors 404-1 and 404-2 are microprocessor/microcontroller devices—e.g., a TEXAS INSTRUMENTS AM3892 microprocessor.

The image processors 402-1 and 402-2 include or are associated with memory, e.g., SDRAM devices 406, which serve as working memory for processing image frames from the image sensors 18. They may be configured on boot-up or reset by the respective control processors 404-1 and 404-2, which also include or are associated with working memory (e.g., SDRAM devices 408), and which include boot/configuration data in FLASH devices 410.

The cross-connections seen between the respective image processors 402 and between the respective control processors 404 provide for the dual-channel, redundant monitoring of the primary monitoring zone 12 using the first and second primary-baseline pairs of image sensors 18. In this regard, one sees the "left-side" image sensors 18-1 and 18-3 coupled to the image processor 402-1 and to the image processor 402-2. Likewise, the "right-side" image sensors 18-2 and 18-4 are coupled to both image processors 402.

Further, in an example division of functional tasks, the image processor 402-1 and the control processor 404-1 establish the system timing and support the physical (PHY) interface 38 to the control unit 20, which may be an Ethernet interface. The control processor 404-1 is also responsible for configuring the SVP 400, where the image processor 402-1 acts as a gateway to the SVP's host interface. The control processor 404-1 also controls a bus interface that configures the imager sensors 18. Moreover, the image processor 402-1 also includes a connection to that same bus in order to provide more precision when performing exposure control operations.

In turn, the control processor 404-2 and the image processor 402-2 form a redundant processing channel with respect to above operations. In this role, the image processor 402-2 monitors the clock generation and image-data interleaving of the image processor 402-1. For this reason, both image processors 402 output image data of all image sensors 18, but only the image processor 402-1 generates the image sensor clock and synchronization signals.

The image processor 402-2 redundantly performs the stuck and noisy pixel detection algorithms and redundantly clusters protection-zone violations using depth data captured from the SVP host interface. Ultimately, the error detection algorithms, clustering, and object-tracking results from the image processor 402-2 and the control processor 404-2, must exactly mirror those from image processor 402-1 and the control processor 404-1, or the image processing circuits 36 will declare a fault, triggering the overall apparatus 10 to enter a fault state of operation.

Each image processor 402 operates with an SDRAM device 406, to support data buffered for entire image frames, such as for high-dynamic-range fusion, noisy pixel statistics, SVP test frames, protection zones, and captured video frames for diagnostics. These external memories also allow the image processors 402 to perform image rectification or multi-resolution analysis, when implemented.

The interface between each control processor 404 and its respective image processor 402 is a high-speed serial interface, such as a PCI-express or SATA type serial interface. Alternatively, a multi-bit parallel interface between them could be used. In either approach, the image processing circuits 36 use the "host interface" of the SVP 400, both for control of the SVP 400 and for access to the output depth and rectified-image data. The host interface of the SVP 400 is designed to run fast enough to transfer all desired outputs at a speed that is commensurate with the image capture speed.

Further, an inter-processor communication channel allows the two redundant control processors 404 to maintain synchronization in their operations. Although the control processor 404-1 controls the PHY interface 38, it cannot make the final decision of the run/stop state of the apparatus 10 (which in turn controls the run/stop state of a hazardous machine within the primary monitoring zone 12, for example). Instead, the control processor 404-2 also needs to generate particular machine-run unlock codes (or similar values) that the control processor 404-1 forwards to the control unit 20 through the PHY interface 38. The control unit 20 then makes the final decision of whether or not the two redundant channels of the sensor unit 16 agree on the correct machine state. Thus, the control unit 20 sets, for example, the run/stop state of its OSSD outputs to the appropriate run/stop state in dependence on the state indications from the dual, redundant channels of the sensor unit 16. Alternatively, the sensor unit 16 can itself make the final decision of whether or not the two redundant channels of the sensor unit 16 agree on the correct machine state, in another example embodiment.

The inter-processor interface between the control processors 404-1 and 404-2 also provides a way to update the sensor unit configuration and program image for control processor 404-2. An alternative approach would be to share a single flash between the two control processors 404, but that arrangement could require additional circuitry to properly support the boot sequence of the two control processors 404.

As a general proposition, pixel-level processing operations are biased towards the image processors 402, and the use of fast, FPGA-based hardware to implement the image processors 402 complements this arrangement. However, some error detection algorithms are used in some embodiments, which require the control processors 404 to perform certain pixel-level processing operations.

Even here, however, the image processor(s) 402 can indicate "windows" of interest within a given image frame or frames, and send only the pixel data corresponding to the window of interest to the control processor(s) 404, for processing. Such an approach also helps reduce the data rate across the interfaces between the image and control processors 402 and 404 and reduces the required access and memory bandwidth requirements for the control processors 404.

Because the image processor 402-1 generates interleaved image data for the SVP 400, it also may be configured to inject test image frames into the SVP 400, for testing the SVP 400 for proper operation. The image processor 402-2 would then monitor the test frames and the resulting output from the SVP 400. To simplify image processor design, the image processor 402-2 may be configured only to check the CRC of the injected test frames, rather than holding its own redundant copy of the test frames that are injected into the SVP 400.

In some embodiments, the image processing circuits 36 are configured so that, to the greatest extent possible, the image processors 402 perform the required per-pixel operations, while the control processors 404 handle higher-level and floating-point operations. In further details regarding the allocation of processing functions, the following functional divisions are used.

For image sensor timing generation, one image processor 402 generates all timing, and the other image processor 402 verifies that timing. One of the control processors 404 sends timing parameters to the timing-generation image processor 402, and verifies timing measurements made by the image processor 402 performing timing verification of the other image processor 402.

For HDR image fusion, the image processors 402 buffer and combine image pairs acquired using low- and high-integration sensor exposures, using an HDR fusion function. The control processor(s) 404 provide the image processors 402 with necessary setup/configuration data (e.g., tone-mapping and weighting arrays) for the HDR fusion function. Alternatively, the control processor(s) 402 alternates the image frame register contexts, to achieve a short/long exposure pattern.

For the image rectification function, the image processors 402 interpolate rectified, distortion-free image data, as derived from the raw image data acquired from the image sensors 18. Correspondingly, the control processor(s) 404 generate the calibration and rectification parameters used for obtaining the rectified, distortion-free image data.

One of the image processors 402 provides a configuration interface for the SVP 400. The image processors 402 further send rectified images to the SVP 400 and extract corresponding depth maps (3D range data for image pixels) from the SVP 400. Using an alternate correspondence algorithm, for example, Normalized Cross-Correlation (NCC), the image processors 402 may further refine the accuracy of sub-pixel interpolation, as needed. The control processor(s) 404 configure the SVP 400, using the gateway provided by one of the image processors 402.

For clustering, the image processors 402 cluster foreground and "mitigation" pixels and generate statistics for each such cluster. Correspondingly, the control processor(s) 404 generate protection boundaries for the primary monitoring zone 12—e.g., warning boundaries, safety-critical boundaries, etc., that define the actual 3D ranges used for evaluating whether a detected object triggers an intrusion warning, safety-critical shut-down, etc.

For object persistence, the control processors 404 perform temporal filtering, motion tracking, and object split-merge functions.

For bad pixel detection operations, the image processors 402 maintain per-pixel statistics and interpolation data for bad pixels. The control processor(s) 404 optionally load a factory defect list into the image processors 402. The factory defect list allows, for example, image sensors 18 to be tested during manufacturing, so that bad pixels can be detected and recorded in a map or other data structure, so that the image processors 402 can be informed of known-bad pixels.

For exposure control operations, the image sensors 402 collect global intensity statistics and adjust the exposure timing. Correspondingly, the control processor(s) 404 provide exposure-control parameters, or optionally implement per-frame proportional-integral-derivative (PID) or similar feedback control for exposure.

For dynamic range operations, the image processors 402 generate dynamic-range mitigation bits. Correspondingly, the control processor(s) 404 provide dynamic range limits to the image processors 402.

For shadowing object detection operations, the image processors 402 create additional transformed images, if necessary, and implement, e.g., a pixel-matching search to detect image differences between the image data acquired by the two image sensors 18 in each secondary-baseline pair. For example, pixel-matching searches are used to compare the image data acquired by the image sensor 18-1 with that acquired by the image sensor 18-3, where those two sensors 18-1 and 18-3 comprise the first secondary-baseline pair. Similar comparisons are made between the image data acquired by the second secondary-baseline pair, comprising the image sensors 18-2 and 18-4. In support of shadowing object detection operations, the control processor(s) 404 provide limits and/or other parameters to the image processors 402.

For reference marker detection algorithms, the image processors 402 create distortion-free images, implement NCC searches over the reference markers within the image data, and find the best match. The control processors 404 use the NCC results to calculate calibration and focal length corrections for the rectified images. The control processor(s) 404 also may perform bandwidth checks (focus) on windowed pixel areas. Some other aspects of reference maker mitigation algorithm may also require rectified images.

In some embodiments, the SVP 400 may perform image rectification, but there may be advantages to performing image rectification in the image processing circuit 402. For example, such processing may more naturally reside in the image processors 402 because it complements other operations performed by them. For example, the image sensor bad-pixel map (stuck or noisy) must be rectified in the same manner as the image data. If the image processors 402 already need to implement rectification for image data, it may make sense for them to rectify the bad pixel maps, to insure coherence between the image and bad-pixel rectification.

Further, reference-marker tracking works best, at least in certain instances, with a distortion-free image that is not rectified. The interpolation logic for removing distortion is similar to rectification, so if the image processors 402 create distortion-free images, they may include similarly-configured additional resources to perform rectification.

Additionally, shadowing-object detection requires at least one additional image transformation for each of the secondary baselines 34-1 and 34-2. The SVP 400 may not have the throughput to do these additional rectifications, while the image processors 402 may be able to comfortably accommodate the additional processing.

Another aspect that favors the consolidation of most pixel-based processing in the image processors 402 relates to the ZLDC. One possible way to reduce the ZLDC is to use a multi-resolution analysis of the image data. For example, an image reduced by a factor of two in linear dimensions is input to the SVP 400 after the corresponding "normal" image is input. This arrangement would triple the maximum disparity realized by the SVP 400.

In another aspect of stereo correlation processing performed by the SVP 400 (referred to as "stereoscopic processing"), the input to the SVP 400 is raw or rectified image pairs. The output of the SVP 400 for each input image pair is a depth (or disparity) value for each pixel, a correlation score and/or interest operator bit(s), and the rectified image data. The correlation score is a numeric figure that corresponds to the quality of the correlation and thus provides a measure of the reliability of the output. The interest operator bit provides an indication of whether or not the pixel in question meets predetermined criteria having to do with particular aspects of its correlation score.

Clustering operations, however, are easily pipelined and thus favor implementation in FGPA-based embodiments of the image processors 402. As noted, the clustering process connects foreground pixels into "clusters," and higher levels of the overall object-detection algorithm implemented by the image processing circuits 36 determine if the number of pixels, size, and pixel density of the cluster make it worth tracking.

Once pixel groups are clustered, the data rate is substantially less than that represented by the stream of stereo images or the corresponding depth maps. Because of this fact and because of the complexity of tracking objects, the identification and tracking of objects is advantageously performed in the control processors 404, at least in embodiments where microprocessors or DSPs are used to implement the control processors 404.

With bad pixel detection, the image processing circuits 36 check for stuck (high/low) pixels and noisy pixels using a sequence of high- and low-integration test frames. Bad pixels from the stuck-pixel mitigation are updated within the detection response time of the apparatus 10, while the algorithm requires multiple test frames to detect noisy pixels. These algorithms work on raw image data from the image sensors 18.

The stuck-pixel tests are based on simple detection algorithms that are easily supported in the image processors 402, however, the noisy-pixel tests, while algorithmically simple, require buffering of pixel statistics for an entire image frame. Thus, to the extent that the image processors 402 do such processing, they are equipped with sufficient memory for such buffering.

More broadly, in an example architecture, the raw image data from the image sensors 18 only flows from the image sensors 18 to the image processors 402. Raw image data need not flow from the image processors 402 to the control processors 404. However, as noted, the bad image sensor pixels must undergo the same rectification transformation as the image pixels, so that the clustering algorithm can apply them to the correct rectified-image coordinates. In this regard, the image processors 402 must, for bad pixels, be able to minor the same rectification mapping done by the SVP 400.

When bad pixels are identified, their values are replaced with values interpolated from neighboring "good" pixels. Since this process requires a history of multiple scan lines, the process can be pipelined and is suitable for implementation in any FPGA-based version of the image processors 402.

While certain aspects of bad pixel detection are simple algorithmically, shadowing object detection comprises a number of related functions, including: (a) intensity comparison between the image sensors 18 in each secondary baseline pair; (b) post processing operations such as image morphology to suppress false positives; (c) detection of horizontal lines that could represent a uniform shadowing object that extends beyond the protection zone and continues to satisfy (a) above.

The reference-marker-based error detection algorithms are designed to detect a number of conditions including loss of focus, loss of contrast, loss of image sensor alignment, loss of world (3D coordinate) registration, and one or more other image sensor errors.

Figure 5:
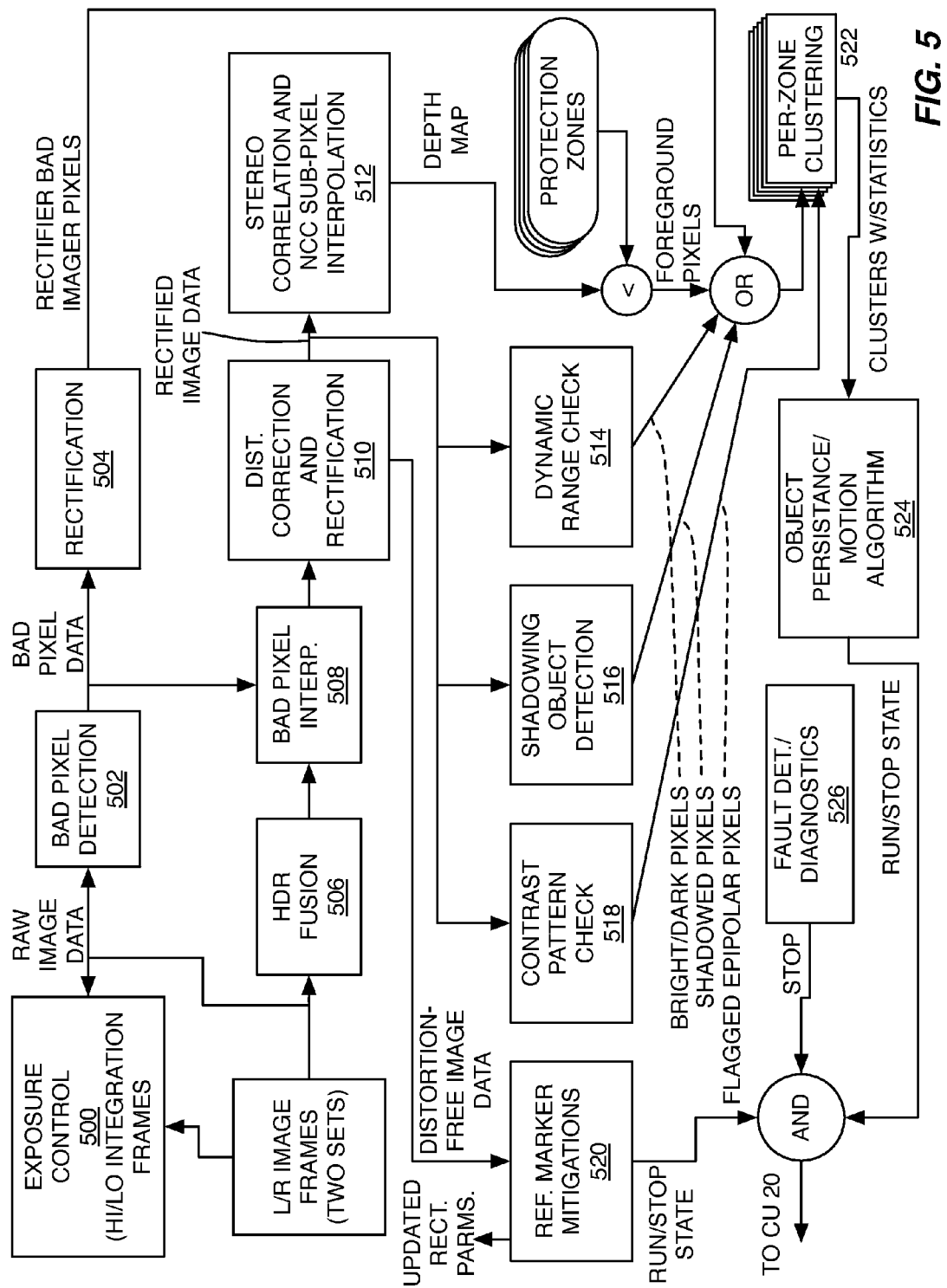
FIG. 5 is a block diagram of one embodiment of functional processing blocks realized in the image processing circuits of FIG. 4, for example.

FIG. 5 illustrates "functional" circuits or processing blocks corresponding to the above image-processing functions, which also optionally include a video-out circuit 412, to provide output video corresponding to the fields-of-view 14 of the image sensors 18, optionally with information related to configured boundaries, etc. It will be understood that the illustrated processing blocks provided in the example of FIG. 5 are distributed among the image processors 402 and the control processors 404.

With that in mind, one sees functional blocks including these items: an exposure control function 500, a bad pixel detection function 502, a bad-pixel rectification function 504, an HDR fusion function 506, a bad-pixel interpolation function 508, an image distortion-correction-and-rectification function 510, a stereo-correlation-and-NCC-sub-pixel-interpolation function 512, a dynamic range check function 514, a shadowing object detection function 516, a contrast pattern check function 518, a reference marker mitigations function 520, a per-zone clustering function 522, an object persistence and motion algorithm function 524, and a fault/diagnostics function 526. Note that one or more of these functions may be performed redundantly, in keeping with the redundant object detection based on the dual-channel monitoring of the primary monitoring zone 12.

Image capture takes place in a sequence of continuous time slices—referred to as "frames." As an example, the image processing circuits 36 operate at a frame rate of 60 fps. Each baseline 32 or 34 corresponds to a pair of image sensors 18, e.g., a first pair comprising image sensors 18-1 and 18-2, a second pair comprising image sensors 18-3 and 18-4, a third pair comprising image sensors 18-1 and 18-3, and a fourth pair comprising image sensors 18-2 and 18-4.

Raw image data for each baseline are captured simultaneously. Noisy, stuck or low sensitivity pixels are detected in raw images and used to generate a bad pixel map. Detected faulty pixel signals are corrected using an interpolation method utilizing normal neighboring pixels. This correction step minimizes the impact of faulty pixels on further stages of the processing pipeline.

High and low exposure images are taken in sequence for each baseline pair. Thus, each sequence of image frames contains alternate high and low exposure images. One or two frames per response time cycle during the image stream will be reserved for test purposes, where "image stream" refers to the image data flowing on a per-image frame basis from each pair of image sensors 18.

High and low exposure frames from each image sensor 18 are combined into a new image, according to the HDR fusion process described herein. The resulting HDR image has an extended dynamic range and is called a high dynamic range (HDR) frame. Note that the HDR frame rate is now 30 Hz, as it takes two raw images taken at different exposures, at a 60 Hz rate, to create the corresponding HDR image. There is one 30 Hz HDR image stream per imager or 30 Hz HDR image pair per baseline.

The images are further preprocessed to correct optical distortions, and they also undergo a transformation referred to in computer vision as "rectification." The resulting images are referred to as "rectified images" or "rectified image data." For reference, one sees such data output from functional block 510. The bad pixel map also undergoes the same rectification transformations, for later use—see the rectification block 504. The resulting bad pixel data contains pixel weights that may be used during the clustering process.

The rectified image data from functional block 510 is used to perform a number of checks, including: a dynamic range check, where the pixels are compared against saturation and under-saturation thresholds and flagged as bad if they fall outside of these thresholds; and a shadowing object check, where the images are analyzed to determine whether or not an object is present in the ZLDC, or in "Zone of Side Shadowing" (ZSS). Such objects, if present, might cast a shadow in one or more of the sensor fields-of-view 14, effectively making the sensor unit 16 blind to objects that might lie in that shadow. Groups of pixels corresponding to a shadowed region are flagged as "bad", in order to identify this potentially dangerous condition.

Such operations are performed in the shadowing object detection function 516. Further checks include a bad contrast pattern check—here the images are analyzed for contrast patterns that could make the resulting range measurement unreliable. Pixels failing the test criteria are flagged as "bad." In parallel, rectified images are input to the SVP 400—represented in FIG. 5 in part by Block 512. If the design is based on a single SVP 400, HDR image frames for each primary baseline 32-1 and 32-2 are alternately input into the SVP 400 at an aggregate input rate of 60 Hz. To do so, HDR frames for one baseline 32-1 or 32-2 are buffered while the corresponding HDR frames for the other baseline 32-1 or 32-2 are being processed by the SVP 400. The range data are post-processed to find and reject low quality range points, and to make incremental improvements to accuracy, and then compared with a defined detection boundary.

Pixels whose 3D range data puts them within the detection boundary are grouped into clusters. Bad pixels, which are directly identified or identified through an evaluation of pixel weights, are also included in the clustering process. The clustering process can be performed in parallel for multiple detection boundaries. The sizes of detected clusters are compared with minimum object size, and clusters meeting or exceeding the minimum object size are tracked over the course of a number of frames to suppress erroneous false detections. If a detected cluster consistent with a minimum sized object persists over a minimum period of time (i.e., a defined number of consecutive frames), the event is classified as an intrusion. Intrusion information is sent along with fault status, as monitored from other tests, to the control unit 20, e.g., using a safe Ethernet protocol.

Reference marker monitoring, as performed in Block 520 and as needed as a self-test for optical faults, is performed using rectified image data, in parallel with the object detection processing. The reference-marker monitoring task not only provides a diagnostic for optical failures, but also provides a mechanism to adjust parameters used for image rectification, in response to small variations in sensitivity due to thermal drift.

Further, a set of background and runtime tests provide outputs that are also used to communicate the status of the sensor unit 16 to the control unit 20. Further processing includes an exposure control algorithm running independent from the above processing functions—see Block 500. The exposure control algorithm allows for adjustment in sensitivity to compensate for slowly changing lighting conditions, and allows for coordinate-specific tests during the test frame period.

While the above example algorithms combine advantageously to produce a robust and safe machine vision system, they should be understood as non-limiting examples subject to variation. Broadly, object detection processing with respect to the primary monitoring zone 12 uses stereoscopic image processing techniques to measure 3D Euclidean distance.

As such, the features of dual baselines, shadowing detection, and high dynamic range imaging, all further enhance the underlying stereoscopic image processing techniques. Dual baselines 32-1 and 32-2 for the primary monitoring zone 12 provide redundant object detection information from the first and second stereo channels. The first stereo channel obtains first baseline object detection information, and the second stereo channel obtains second baseline object detection information. The object detection information from the first baseline is compared against the object detection information from the second baseline. Disagreement in the comparison indicates a malfunction or fault condition.

While the primary baselines 32 are used for primary object detection in the primary monitoring zone 12, the secondary baselines 34 are used for shadowing object detection, which is performed to ensure that a first object in close proximity to the sensor unit 16 does not visually block or shadow a second object farther away from the sensor unit 16. This includes processing capability needed to detect objects detected by one image sensor 18 that are not detected by another image sensor 18.

Figure 6:
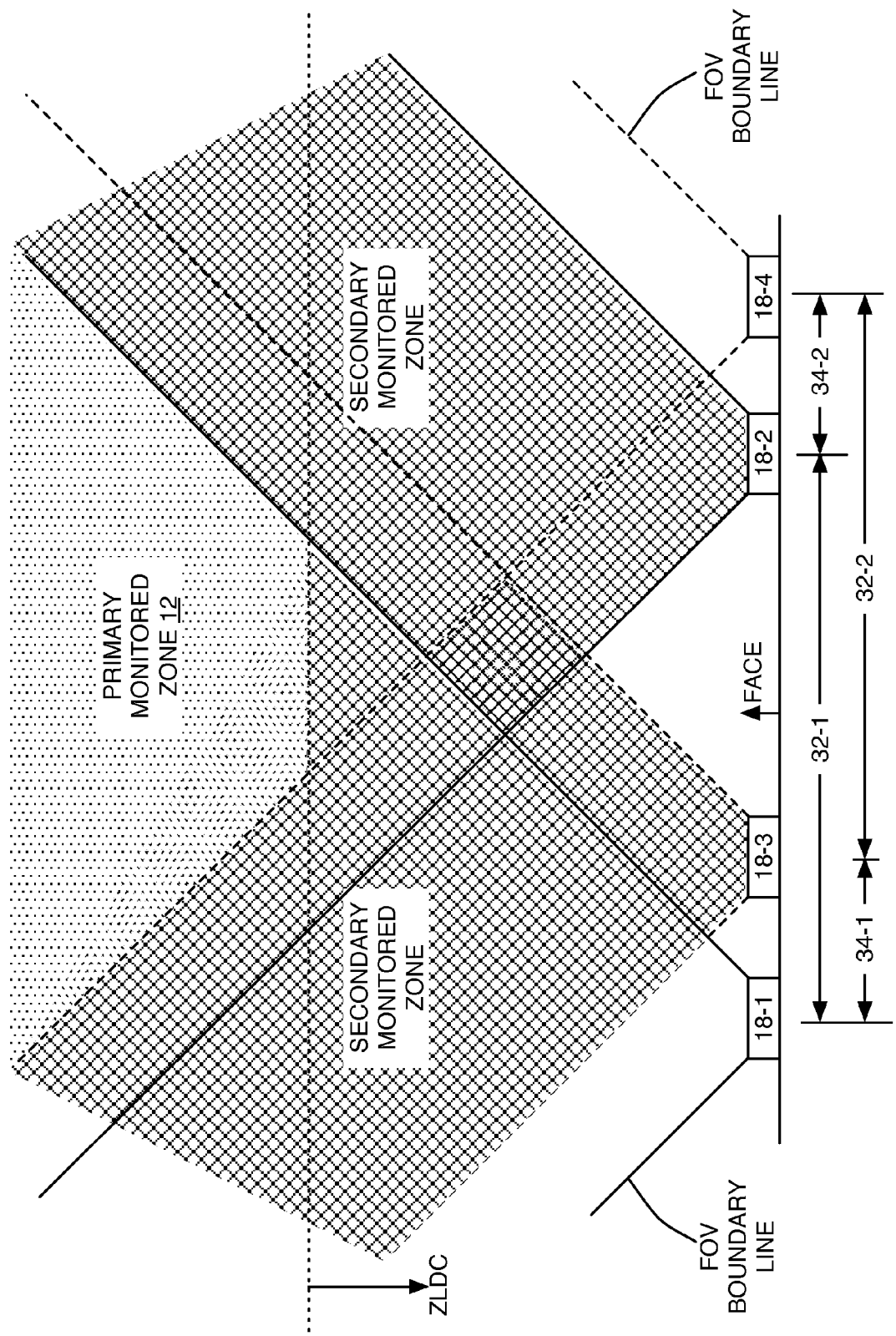
FIG. 6 is a diagram of the various zones defined by the sensor fields-of-view of an example sensor unit.
Figure 7A:
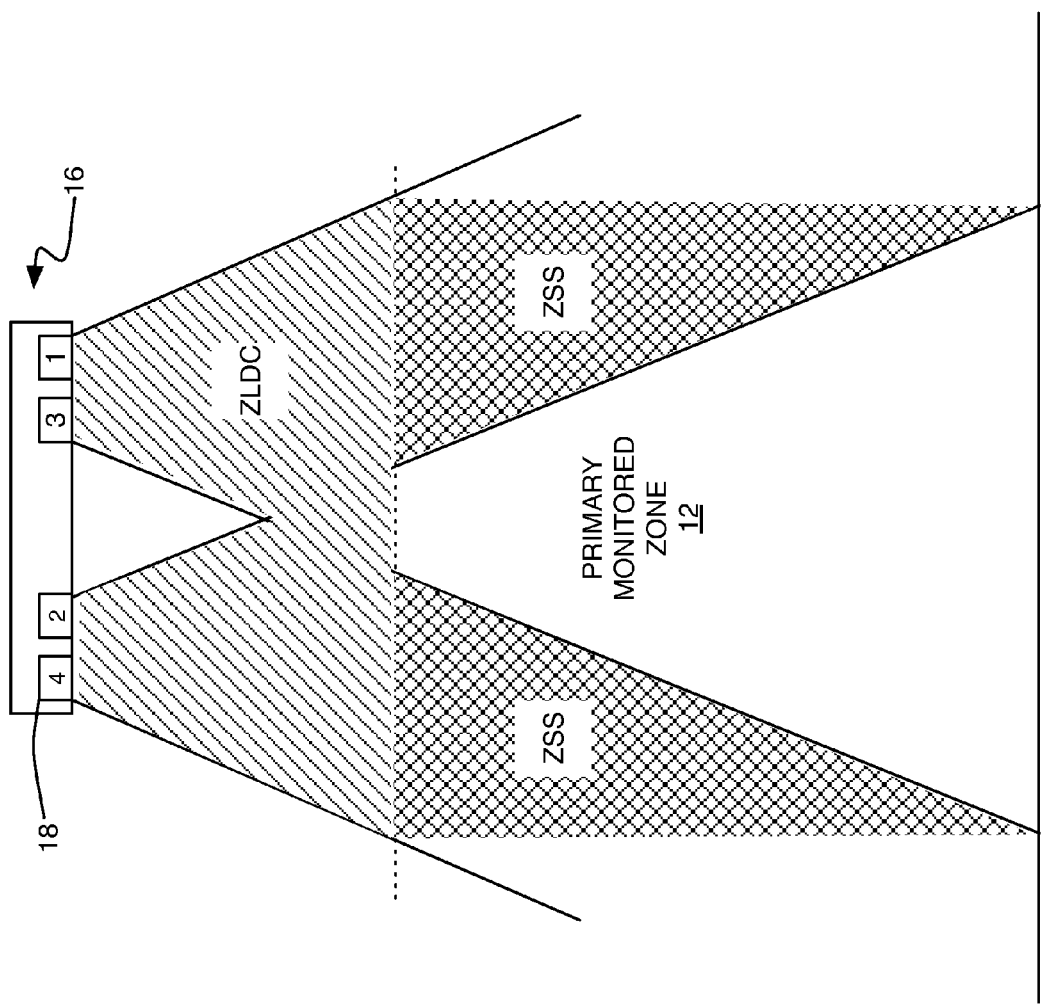

FIGS. 6 and 7A/B provide helpful illustrations regarding shadowing object detection, and the ZLDC and ZSS regions. In one or more embodiments, and with specific reference to FIG. 6, the image sensors 18-1 and 18-2 are operated as a first stereo pair providing pairs of stereo images for processing as a first stereo channel, the image sensors 18-3 and 18-4 are operated as a second stereo pair providing pairs of stereo images for processing as a second stereo channel, the image sensors 18-1 and 18-3 are operated as a third stereo pair providing pairs of stereo images for processing as a third stereo channel, and the image sensors 18-2 and 18-4 are operated as a fourth stereo pair providing pairs of stereo images for processing as a fourth stereo channel. The first and second pairs are separated by the primary baselines 32-1 and 32-2, respectively, while the third and four stereo pairs are separated by the secondary baselines 34-1 and 34-2, respectively.

As noted earlier herein, the primary object ranging technique employed by the image processing circuits 36 of a sensor unit 16 is stereo correlation between two image sensors 18 located at two different vantage points, searching through epipolar lines for the matching pixels and calculating the range based on the pixel disparity.

This primary object ranging technique is applied at least to the primary monitoring zone 12, and FIG. 6 illustrates that the first and second stereo channels are used to detect objects in a primary monitoring zone 12. That is, objects in the primary monitoring zone 12 are detected by correlating the images captured by the first image sensor 18-1 with images captured by the second image sensor 18-2 (first stereo channel) and by correlating images captured by the third image sensor 18-3 with images captured by the fourth image sensor 18-4 (second stereo channel). The first and second stereo channels thus provide redundant detection capabilities for objects in the primary monitoring zone 12.

The third and fourth stereo channels are used to image secondary monitoring zones, which encompass the sensor fields-of-view 14 that are (1) inside the ZLDC and/or (2) within one of the ZSS. In this regard, it should be understood that objects of a given minimum size that are in the ZLDC are close enough to be detected using disparity-based detection algorithms operating on the image pairs acquired by each of the secondary-baseline pairs. However, these disparity-based algorithms may not detect objects that are beyond the ZLDC limit but within one of the ZSS (where the object does not appear in all of the sensor fields-of-view 14), because the observed image disparities decrease as object distance increases. One or both of two risk mitigations may be used to address shadowing object detection in the ZSS.

First, as is shown in FIG. 8, the sensor unit 16 may be configured so that the verging angles of the image sensors 18 are such that the ZSS are minimized. Second, objects in the ZSS can be detected using stereo correlation processing for the images captured by the first and second secondary-baseline pairs. That is, the image processing circuits 36 may be configured to correlate images captured by the first image sensor 18-1 with images captured by the third image sensor 18-3 (third stereo channel), and correlate images captured by the second image sensor 18-2 with images captured by the fourth image sensor 18-4 (fourth stereo channel). Thus, the image processing circuits 36 use stereo correlation processing for the image data acquired from the first and second stereo channels (first and second primary-baseline pairs of image sensors 18), for object detection in the primary monitoring zone 12, and use either or both of intensity-difference and stereo-correlation processing for the image data acquired from the third and fourth stereo channels (first and second secondary-baseline pairs of image sensors 18), for object detection in the ZLDC and ZSS.

As shown by way of example in FIGS. 7A and 7B, the third and fourth stereo channels are used to detect objects in the secondary monitored zones, which can shadow objects in the primary monitoring zone 12. The regions directly in front of the sensor unit 16 and to either side of the primary monitoring zone 12 cannot be used for object detection using the primary-baseline stereo channels—i.e., the first and second stereo channels corresponding to the primary baselines 32-1 and 32-2.

For example, FIG. 7B illustrates a shadowing object "1" that is in between the primary monitoring zone 12 and the sensor unit 16—i.e., within the ZLDC—and potentially shadows objects within the primary monitoring zone 12. In the illustration, one sees objects "A" and "B" that are within the primary monitoring zone 12 but may not be detected because they lie within regions of the primary monitoring zone 12 that are shadowed by the shadowing object "1" with respect to one or more of the image sensors 18.

FIG. 7B further illustrates another shadowing example, where an object "2" is beyond the minimum detection range (beyond the ZLDC border) but positioned to one side of the primary monitoring area 12. In other words, object "2" lies in one of the ZSS, and thus casts a shadow into the primary monitoring zone 12 with respect to one or more of the image sensors 18 on the same side. Consequently, an object "C" that is within the primary monitoring zone 12 but lying within the projective shadow of object "2" may not be reliably detected.

Thus, while shadowing objects may not necessarily be detected at the same ranging resolution as provided for object detection in the primary monitoring zone 12, it is important for the sensor unit 16 to detect shadowing objects. Consequently, the image processing circuits 36 may be regarded as having a primary object detection mechanism for full-resolution, redundant detection of objects within the primary monitoring zone 12, along with a secondary object detection mechanism, to detect the presence of objects inside the ZLDC, and a third object detection mechanism, to detect the presence of objects in ZSS regions. The existence of verging angles between the left and right side impose a final image sensor/FOV configuration, such as example of FIG. 8. The verging angles may be configured so as to eliminate or substantially reduce the ZSS on either side of the primary monitoring zone 12, so that side-shadowing hazards are reduced or eliminated.

Object detection for the ZLDC region is based on detecting whether there are any significant differences between adjacent image sensors 18 located at each side of the sensor unit 16. For example, such processing involves the comparison of image data from the image sensor 18-1 with that of the image sensor 18-3. (Similar processing compares the image data between the image sensors 18-2 and 18-4.) When there is an object close to the sensor unit 16 and in view of one of these closely spaced image sensor pairs, a simple comparison of their respective pixel intensities within a neighborhood will reveal significant differences. Such differences are found by flagging those points in one image that do not have intensity matches inside a given search window corresponding to the same location in the other image. The criteria that determine a "match" are designed in such a way that makes the comparison insensitive to average gain and/or noise levels in each imager.

As another example, the relationship between the secondary (short) and primary (long) baseline lengths, t and T, respectively, can be expressed as $t/T=D/d$. Here, D is the maximum disparity search range of the primary baseline, and d is search window size of the image difference algorithm.

This method is designed to detect objects inside of and in close proximity to the ZLDC region. Objects far away from the ZLDC region will correspond to very small disparities in the image data, and thus will not produce such significant differences between when the images from a closely spaced sensor pair are compared. To detect objects possibly beyond the ZLDC boundary but to one side of the primary monitoring zone 12, the closely spaced sensor pairs may be operated as stereo pairs, with their corresponding stereo image pairs processed in a manner that searches for objects only within the corresponding ZSS region.

Of course, in all or some of the above object detection processing, the use of HDR images allows the sensor unit 16 to work over a wider variety of ambient lighting conditions. In one example of an embodiment for HDR image fusion, the image processing circuits 36 perform a number of operations. For example, a calibration process is used as a characterization step to recover the inverse image sensor response function (CRF), g: Z→R required at the manufacturing stage. The domain of g is 10-bit (imager data resolution) integers ranging from 0-1023 (denoted by Z). The range is the set of real numbers, R.

At runtime, the CRF is used to combine the images taken at different (known) exposures to create an irradiance image, E. From here, the recovered irradiance image is tone mapped using the logarithmic operator, and then remapped to a 12-bit intensity image, suitable for processing by the SVP 400.

Several different calibration/characterization algorithms to recover the CRF are contemplated. See, for example, the works of P. Debevec and J. Malik, "Recovering High Dynamic Range Radiance Maps from Photographs", SIGGRAPH 1998 and T. Mitsunaga and S. Nayar, "Radiometric Self Calibration", CVPR 1999.

In any case, the following pseudo-code summarizes an example HDR fusion algorithm, as performed at runtime. Algorithm inputs include: CRF g, Low exposure frame $I_L$, low exposure time $t_L$, high exposure frame $I_H$, and high exposure time $t_H$. The corresponding algorithm output is a 12-bit Irradiance Image, E.

For each pixel p, $$\ln E(p) = \frac{[w(I_L)(g(I_L) - \ln t_L)] + [w(I_H)(g(I_H) - \ln t_H)]}{w(I_L) + w(I_H)},$$

where w:Z→R is a weighting function (e.g., Guassian, hat, etc.). The algorithm continues with mapping ln E(p)→[0, 4096] to obtain a 12-bit irradiance image, E, which will be understood as involving offset and scaling operations.

Because the run-time HDR fusion algorithm operates on each pixel independently, the proposed HDR scheme is suitable for implementation on essentially any platform that supports parallel, processing. For this reason, FPGA-based implementation of the image processors 402 becomes particularly advantageous.

Figure 9:
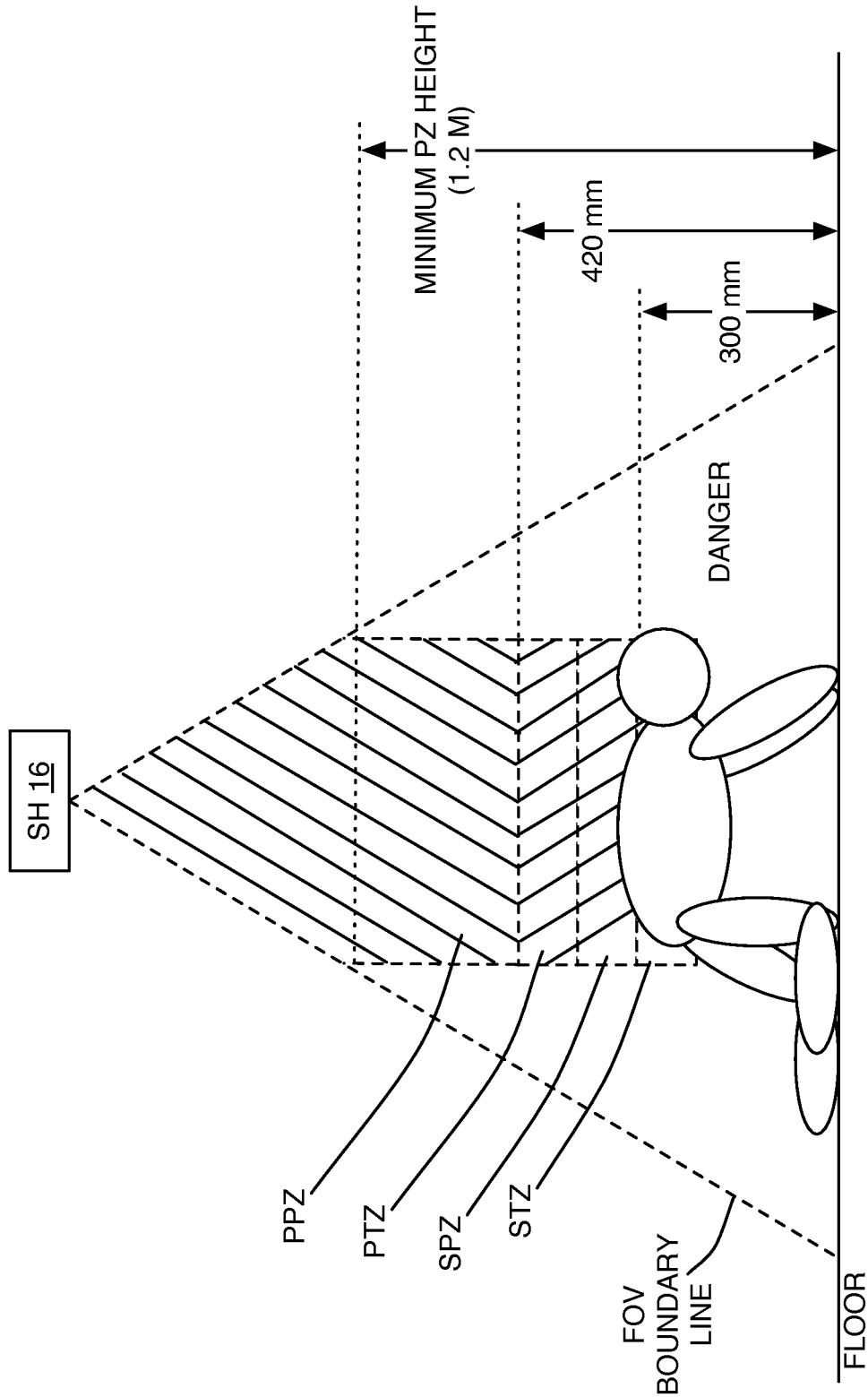
FIG. 9 is a block diagram illustrating an example subdivision of a primary monitoring zone into a primary protection zone (PPZ), a primary tolerance zone (PTZ), a secondary protection zone (SPZ), and a secondary tolerance zone (STZ).

Of course, these and other implementation details can be varied, at least to some extent, in dependence on performance requirements and application details. In one example, the apparatus 10 uses a primary monitoring zone 12 that includes multiple zones or regions. FIG. 9 illustrates an example case, where the primary monitoring zone 12 includes a primary protection zone (PPZ), a primary tolerance zone (PTZ), a secondary protection zone (SPZ), and a secondary tolerance zone (STZ).

Because the apparatus 10 in at least some embodiments is configured as a full body detection system, various possibilities are considered for a person approaching the danger point in different methods. The person may crawl on the floor towards the danger point, or the person may walk/run towards the danger point. The speed of the moving person and the minimum projection size (or image) is a function of the approach methodology. A prone or a crawling person typically moves at a slower speed than a walking person and also projects a larger surface area on the image plane. Two different detection requirements are included which depend on the approach direction of the intrusion. These constraints help suppress false positives without compromising the detection of a human body.

In an example configuration useful in the context of FIG. 9, the PPZ extends from the sensor head (SH) 16 up to 420 mm above the floor. The defined PTZ is defined in a manner that guarantees the detection of a 200 mm diameter worst-case test piece moving up to a maximum speed of 1.6 m/s. The PPZ ensures the detection of a walking/running person.

A crawling person on the other hand will move at a slower maximum speed (e.g., 0.8 m/s), while only partially intruding the PPZ. To guarantee detection of a crawling person, the apparatus 10 is configured with an SPZ extending from the SH 16 up to 300 mm from the floor (to satisfy the maximum standoff distance requirement). Also the size of the worst-case test piece for this zone is bigger than a 200 mm diameter sphere, because the worst-case projection of a prone human is much larger. Similar to the PTZ, the STZ is defined to maintain the required detection probability. Furthermore, the PTZ overlaps with the SPZ. Note that for a different use or application, these zone definitions may be configured differently, e.g., using different heights and/or worst-case object detection sizes.

As for object detection using these two zones, the apparatus 10 implements two detection criteria (for running and crawling persons) independently, by considering a separate protection boundary and filtering strategy for each case. A first protection zone boundary corresponding to the PPZ and PTZ will detect objects bigger than 200 mm, which can have a maximum speed of 1.6 m/s. A temporal filtering qualification that checks for persistence of clusters for at least m out of n frames can be further employed. For example, to maintain a 200 ms response time for a 60 Hz image frame rate, a 4-out-6 frame filtering strategy can used for this detection algorithm.

Similarly, a second protection zone boundary corresponding to SPZ and STZ is configured to detect objects of minimum size corresponding to the projection of a human torso from an oblique view, moving with a slower maximum speed bounded by a requirement of 0.8 m/s. Slower moving objects—e.g., crawling persons—will cover the same distance (safety distance calculated with respect to moving speed of a walking/running person) in a longer time period. This fact affords a longer response time (200 ms×1.6 m/s÷0.8 m/s=400 ms) for detecting objects in the SPZ. In turn, the longer response time allowance allows for the use of a more robust 8 out of 12 filtering strategy, for object detection in the SPZ, to effectively suppress false positives that may appear from background structures (e.g., the floor).

Thus, a method contemplated herein includes protecting against the intrusion of crawling and walking persons into a monitoring zone based on: acquiring stereo images of a first monitoring zone that begins at a defined height above a floor and of a second monitoring zone that lies below the first monitoring zone and extends downward to a floor or other surface on which persons may walk or crawl; processing the stereo images to obtain range pixels; detecting object intrusions within the first monitoring zone by processing those range pixels corresponding to the first monitoring zone using first object detection parameters that are tuned for the detection of walking or running persons; and detecting object intrusions within the second monitoring zone by processing those range pixels corresponding to the second monitoring zone using second object detection parameters that are tuned for the detection of crawling or prone persons.

In accordance with the contemplated method, the first object detection parameters include a first minimum object size threshold that defines a minimum size for detectable objects within the first monitoring zone, and further include a first maximum object speed that defines a maximum speed for detectable objects within the first monitoring zone. The second object detection parameters include a second minimum object size threshold that is larger than the first minimum object size threshold, and further include a second maximum object speed that is lower than the first maximum object speed.

In an example implementation, the first monitoring zone begins about 420 mm above the floor or other surface and extends projectively to the SH 16, and the second monitoring zone extends from 300 mm above the floor or other surface up to the beginning of the first monitoring zone, or up to the SH 16. Further, the first minimum object size threshold, corresponding to the first monitoring zone is at or about 200 mm in cross section; the second minimum object size threshold corresponding to the second monitoring zone is larger than 200 mm in cross section; the first maximum object speed is about 1.6 m/s; and the second maximum object speed is about 0.8 m/s. Of course, the bifurcation of a monitoring zone 12 into multiple monitoring zones or regions for walk/crawl detection or for other reasons represents one example configuration of the apparatus 10 contemplated herein.

Further, despite the use of temporal filtering during object detection as is done in one or more embodiments of the apparatus 10, certain types of persistent structure within the scene can be falsely detected as an object intrusion. Range verification and certain elements of cluster-based processing (e.g., cluster post processing) are required to suppress the following two known cases of false positive detection arising from: (a) a high contrast edge, formed at a junction of two "textureless" regions; and, (b) edges that have a small angle of orientation with respect to the sensor baseline under conditions of epipolar error (i.e., image rows do not exactly correspond to epipolar lines).

To suppress errors due to case (a) above, the apparatus 10 in at least one embodiment is configured to verify the range of pixels that penetrate the protection zone boundary by performing an independent stereo verification using intensity features and a normalized cross correlation (NCC) as a similarity metric. The refined range values are used in successive steps of clustering and filtering.

Errors belonging to case (b) above are systematic errors resulting from edge structures that are aligned with the detection baselines (or have small angles to the baselines). The magnitude of this error is a function of the epipolar shift ($\Delta y$) and the edge orientation ($\theta$) with respect to the baseline, and is given by the following (in terms of disparity error)

$$\Delta d_{epipolar} = \Delta y / \tan(\theta).$$

Hence, the system may be configured to suppress the range points corresponding to edges with a small orientation angle, $\theta$.

Figure 10A:
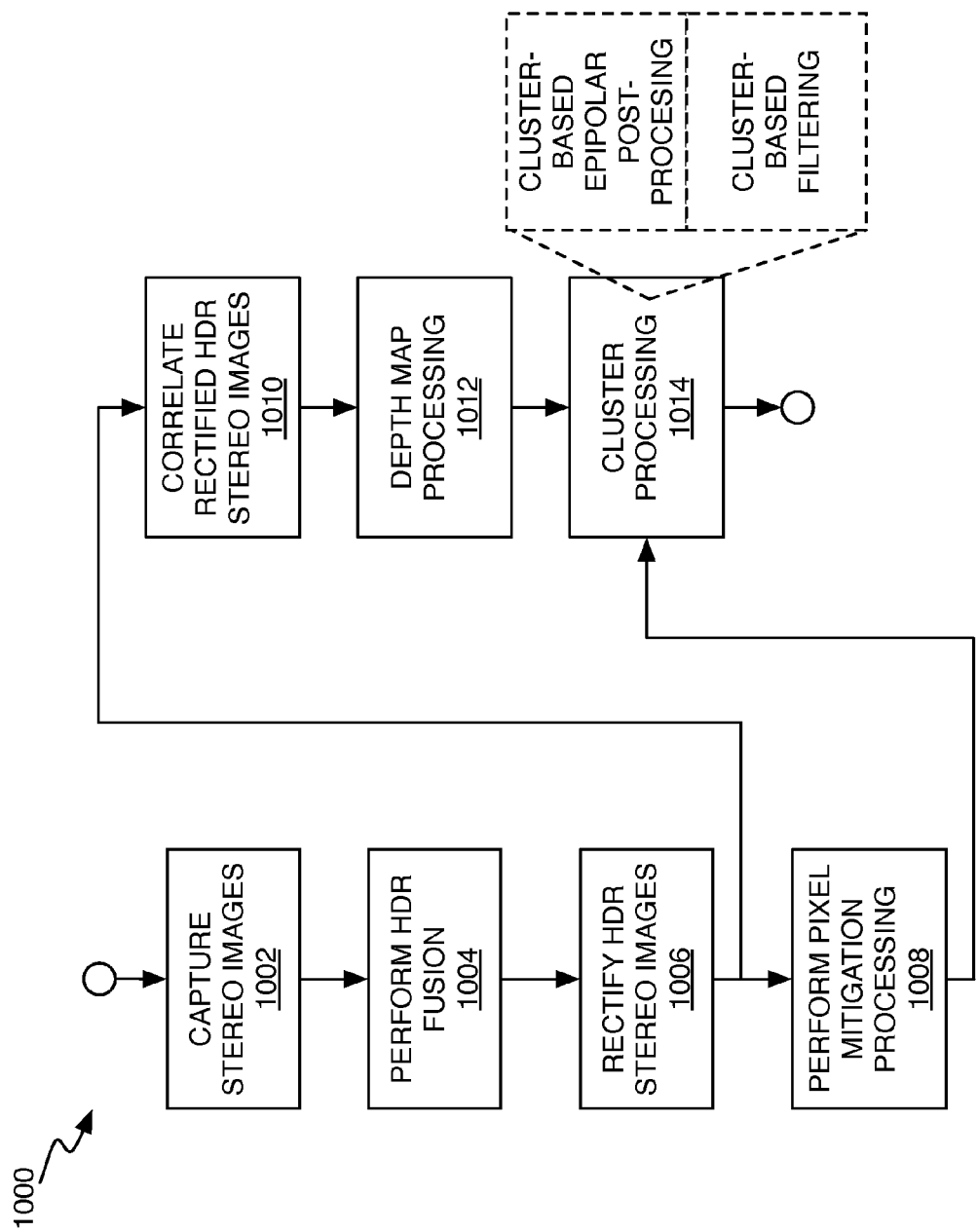
FIGS. 10A and 10B are logic flow diagrams illustrating a detailed example of object detection processing according to one embodiment of image processing circuits in a projective volume monitoring apparatus.
Figure 10B:
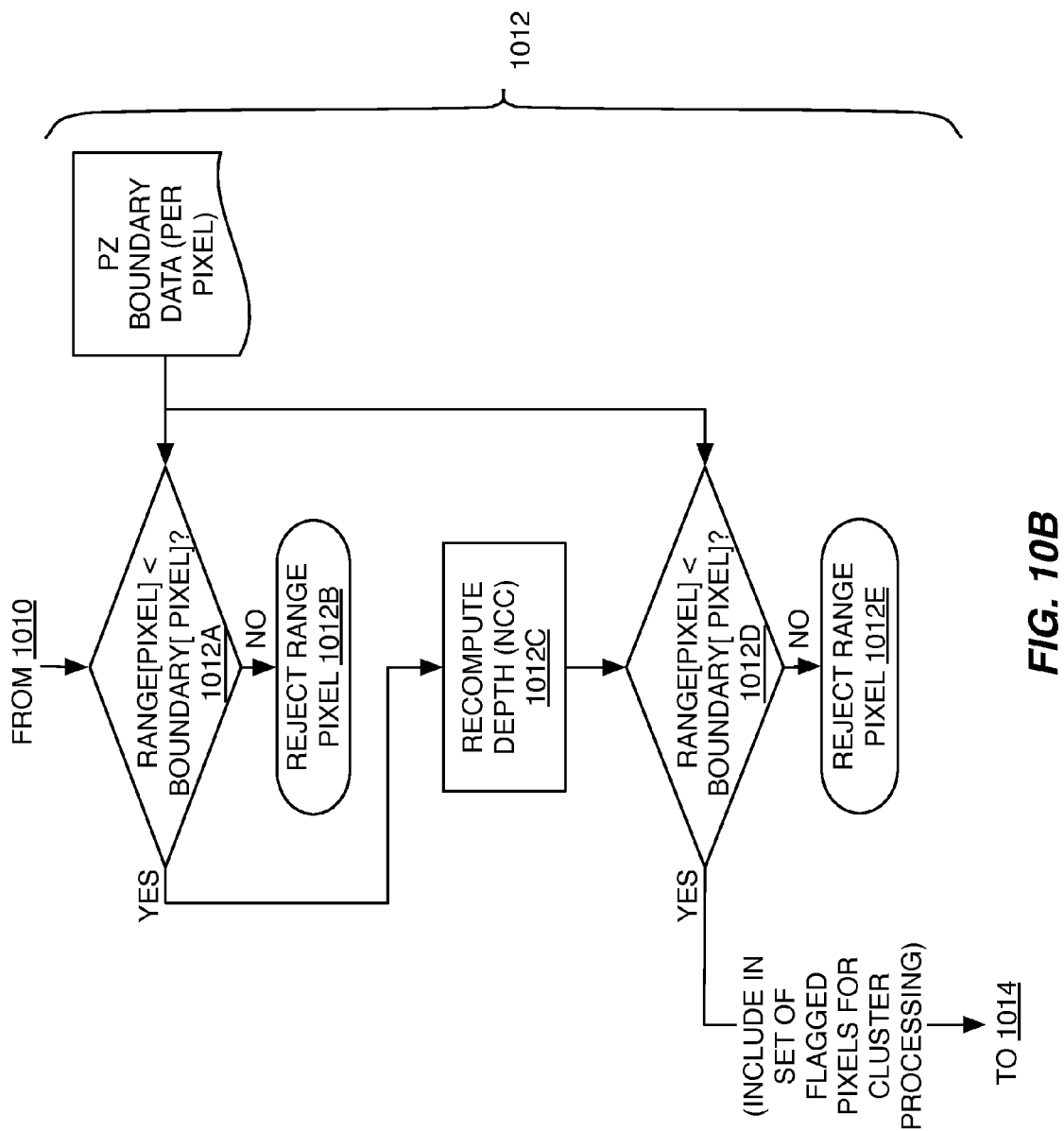

Turning to further example details, FIGS. 10A and 10B illustrate a method 1000 of object detection processing as performed by the apparatus 10 in one or more embodiments. As detailed earlier herein, multiple raw images from pairs of image sensors 18 are captured as stereo images (Block 1002) and composed together to generate high dynamic range images of the scenes imaged in the respective fields-of-view 14 of the involved image sensors 18 (Block 1004).

The resulting HDR images from each stereo channel are rectified such that they correspond to an epipolar geometry (Block 1006), where the corresponding optical axes are parallel and the epipolar lines are the corresponding image rows. Also as explained earlier herein, mitigation processing is performed (Block 1008) to mitigate object detection failures or detection unreliability that would otherwise arise without proper treatment of pixels in the stereo images that are bad (e.g., faulty) or unreliable (e.g., corresponding to regions that may be shadowed from view). Processing the rectified HDR images also includes stereo correlation processing by the stereo vision processor 400 included in the image processing circuits 36 (Block 1010). The stereo vision processor executes a stereo correspondence algorithm to compute the (3D) depth maps which are then subjected to depth map processing (Block 1012).

FIG. 10B provides example details for depth map processing, wherein the range value determined for each range pixel in the depth map produced by the stereo vision processor 400 is compared to the range value of the protection boundary at that pixel location (Block 1012A). Note that this comparison may be made in spherical coordinates, i.e., using radial distance values, based on converting the depth map from Cartesian coordinates (rectilinear positions and distances) into a depth map based on spherical coordinates (solid angle values and radial distance). Thus, a depth map may be in Cartesian coordinates or spherical coordinates, although certain advantages are recognized herein for converting depth maps into to spherical coordinate representations, which represent the projection space of the image sensor fields-of-view.

In any case, if the range pixel being processed has a range that is beyond the protection boundary at that pixel location, it is discarded from further consideration (NO from Block 1012A into Block 1012B). On the other hand, if the range is inside the protection boundary, processing continues with re-computing the depth (range) information using NCC processing (Block 1012C) and the range comparison is performed again (Block 1012D). If the recomputed range is inside the protection boundary (YES from Block 1012D), the pixel is flagged for inclusion in the set of flagged pixels that are subjected to cluster processing. If the recomputed range is outside the protection boundary range (NO from Block 1012D), the pixel is discarded (Block 1012E).

The processing immediately above is an example "refinement" step, wherein the image processing circuits 36 are configured to initially flag depth pixels based on coarse ranging information, e.g., as obtained from initial stereo correlation processing, and then apply a more precise ranging determination to those initially flagged range pixels. This approach thus improves reduces overall computation time and complexity without forfeiting range precision by applying a more precise but slower range computation algorithm to the initially flagged range pixels rather than to all of them, and provides recomputed (more precise) depth information for those initially flagged range pixels. The more precise, recomputed range information is used to verify the flagged range pixels with respect to the protection boundary distances.

Returning to FIG. 10A, processing continues with performing cluster processing on the set of flagged pixels (Block 1014). Such processing can include or be followed by epipolar post processing and/or (temporal) filtering, which is used to distinguish between noise and other transient detection events versus persistent detection events corresponding to real objects.

With the above in mind, the image processing circuits 36 of the apparatus 10 in one or more embodiments is configured to obtain depth maps by converting the 3D depth maps from Cartesian coordinates into spherical coordinates. The depth maps are then used to detect objects within the primary monitoring zone 12. Each valid range pixel in a depth map is compared to a (stored) detection boundary to determine potential pixel intrusions. Pixels that pass this test are subject to range verification (and range update) using the NCC based stereo correlation step, which is explained below. Updated range pixels are subjected to the protection zone boundary test again, and those passing the test are considered for cluster processing. By way of non-limiting example, the protection boundaries can be the earlier-identified PPZ plus PTZ, or the SPZ plus STZ, depending upon which zone is being clustered, with each handled by a corresponding object detection processor. The detected clusters are then subjected to an epipolar error suppression post-processing step, which is explained below. Finally, the surviving clusters are subjected to temporal filtering and false positive suppression tests to determine the final intrusion status.

In more detail, the image processing circuits 36 use a projection space coordinate system to efficiently analyze the range data. This approach is particularly effective because (a) the image sensors 18 are projective sensors, hence the native spherical coordinate system is preferred, and (b) complications such as shadowing objects are easier to handle using projective geometry.

In a specific example, in a projective space:
each pixel (u, v, Z) in a depth map can be considered as a ray through the left camera center. The distance (along the camera Z-axis) of the first visible object along ray (u, v), denoted by Z, is computed using stereo correspondence;
both the shadowing and shadowed object cast the same solid angle;
creating an angular quantization of the 3D space enables application of the same detection principals to both the shadowing and shadowed objects;
the 3D Cartesian coordinates (X, Y, Z) are converted to 3D Spherical coordinates (r, θ, φ);
it is assumed that the protection boundary is known as a function of radial distance along each pixel ray;
the apparatus can therefore compare the radial distance of each ranged pixel to the boundary map(s) and reject the points that fall outside the protection boundaries;
the remaining points are binned in a 2D (θ, φ) histogram, where the (θ, φ) space may be quantized (i.e., quantization of the solid angle); and
the 2D (θ, φ) histogram is interpreted as a 2D image and handed over to the clustering/detection algorithm;
using the above algorithm, the system does not have to deal in an explicit sense with shadowing objects; and
this feature facilitates a unified framework where objection detection can be integrated with other mitigation results (described in below examples).

In relation to the above processing, various embodiments of integrating mitigations with object detection are contemplated herein. In the projective space coordinate system (spherical coordinate system), the image processing circuits 36 integrate the output of per-pixel mitigations directly into to the object detection algorithm, thus achieving a unified processing framework.

Figure 11:
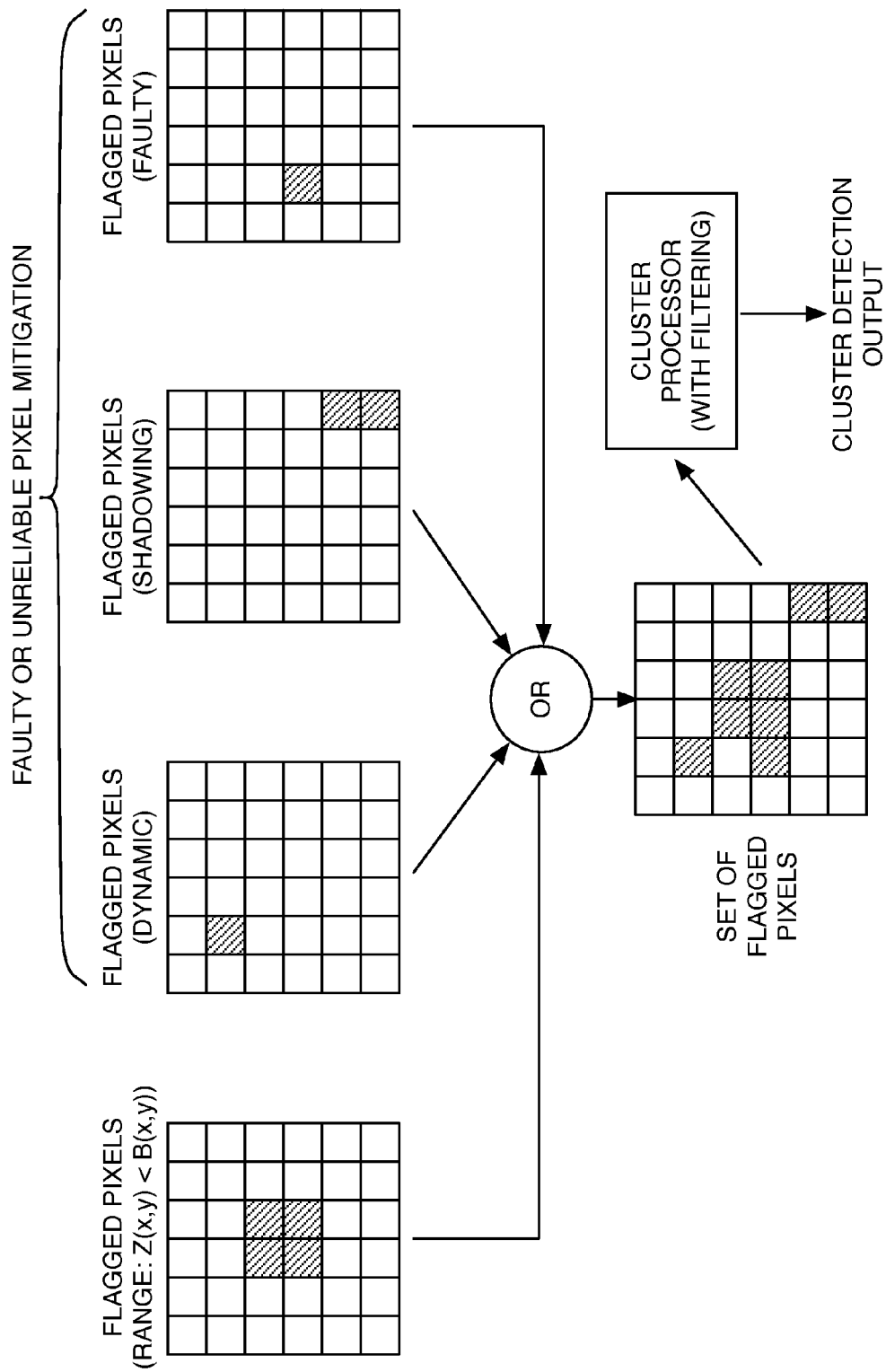
FIG. 11 is a diagram illustrating an example approach to forming a set of flagged pixels for clustering, wherein mitigation pixels are combined with range pixels for consideration in clustering.

FIG. 11 depicts image processing for one contemplated unified processing configuration of the apparatus 10. According to FIG. 11, the image processing circuits 36 are configured to flag a pixel as a potential intrusion if: it has valid range and falls inside a defined protection zone, or is flagged by pixel dynamic range mitigation that detects intensity pixels that are outside the usable dynamic range, or is flagged by shadowing object detection mitigation, or is flagged in the weighted mask corresponding to faulty pixels detected by any imager mitigation. Processing continues with the accumulation of flagged pixels into a histogram that is defined over the projective coordinate system. The projection space represented by the depth map is then clustered to detect objects bigger than the minimum sized object.

Most imager mitigations detect and flag faulty pixels in the raw images from the image sensors 18. Appropriately propagating the faulty pixel information to the rectified images for proper integration with object detection processing requires additional processing. In an example configuration, the image processing circuits 36 are configured to perform the following: for each faulty pixel in a raw image, a weighted pixel mask is calculated based on the image rectification parameters. The weighted mask denotes the degree of impact the faulty raw pixel has on the corresponding rectified pixels. The weighted pixel mask is thresholded to obtain a binary pixel mask, which flags the rectified pixels that are severely impacted by the faulty raw pixel. The flagged rectified pixels are finally integrated with object detection described above and as indicated in FIG. 11. Furthermore, the faulty pixel value is also corrected (as long as it is isolated) in the raw image based on local image interpolation to minimize its impact on the rectified images.

In example details for cluster-based processing by the image processing circuits 36, such circuits are configured to use a two-pass connected component algorithm for object clustering. The implementation may be modified to optimize for FPGA processing—e.g., where the image processor circuits 402 comprise programmed FPGAs. If only cluster statistics are required and pixel association to clusters (i.e., a labeled image) is not desired, then only one pass of the algorithm may be employed where cluster statistics can be updated in the same pass wherever equivalent labels are detected. The processing needed to carry out this algorithm can be efficiently pipelined in an FPGA device.

An 8-connectivity relationship is assumed in the following pseudo-code. Pixel connectivity captures the relationship between two or more pixels. On a 2D image lattice, the following two pixel neighborhoods can be defined: 4-connectivity, wherein a pixel (x, y) is only assumed to be directly connected with pixels (x−1, y), (x+1, y), (x, y−1), (x, y+1); and 8-connectivity, wherein a pixel (x, y) is directly connected with 8 neighboring pixels, i.e., (x−1, y), (x−1, y−1), (x, y−1), (x+1, y−1), (x+1, y), (x+1, y+1), (x, y+1), (x−1, y+1). In the following pseudo-code outline, during the first pass of the connected component algorithm, all eight-connectivity pixel neighbors are evaluated for a given location.

The algorithm example algorithm is as follows:

```
Input: a projection space histogram for the field-of-view 14 associated
    image sensors 18 from which the raw/rectified image frames
    are sourced-the projection space histogram comprises pixel counts
    for each cell that is deemed inside the defined
    protection zone.
Output: detected clusters and associated statistics.
FOR each element in the column
    FOR each element in the row
        IF current element data > threshold THEN
            Get the neighboring elements of the current element
            IF no neighbor found THEN
                Attach new numerical label to the current element
                Update the statistics counters of the new label
                CONTINUE
            ELSE
```

```
            Find the smallest label among the neighbors
            Assign the smallest label to the current element
            Mark all neighboring labels as equivalent
            Merge all the statistics counters of neighboring
                labels to the smallest label
        ENDIF
    ENDFOR
ENDFOR
FOR each element in the column
    FOR each element in the row
        IF current element data > threshold THEN
            Re-label the element with the lowest equivalent
                label
        ENDIF
    ENDFOR
ENDFOR
```

Once the initial clusters are obtained, processing continues with a cluster analysis. In some embodiments, the image processing circuits 36 are configured to perform a spatial cluster split/merge process. In a typical scenario, the worst-case test piece is represented by a single cluster. However, as the projection size of the test piece increases (e.g., due to shorter distance from the camera, or a larger test piece), the single cluster can split into multiple fragments (e.g., due to more horizontal gradients, confusions due to aliasing between the symmetric left/right edges). If the smallest cluster fragment is still bigger than the single cluster under the worst-case conditions, then there is no need to handle these fragments separately. However, if the fragment size is smaller, it is necessary to perform an additional level of clustering (at the cluster level instead of pixel level) to associate potential fragments originating from the same physical surface.

In other words, rather than having a single larger cluster associated with an object that exceeds the minimum object size, there are scenarios in which the object will be represented as multiple smaller clusters. To the extent that these smaller clusters correspond to object sizes less than the minimum object size, the image processing circuits 36 are configured in one or more embodiments to perform an intelligent "clustering of clusters." In a working example, a denotes the size of the worst-case detectable cluster (before split), and b denotes the size of the worst case detectable cluster (after split), such that a>b.

Under these conditions, the clustering algorithm must detect the minimum cluster size of b. In the post processing step to unite the split clusters, the following decisions are made by the image processing circuits 36:

```
Input: List of clusters in the current depth map
Output: Updated cluster list (after combining fragmented clusters)
For each cluster
    IF
        The detected cluster size is greater than a, then accept cluster
    ELSE
        // a > Cluster.Size > b
        Combine this cluster with other clusters in the neighborhood
            (e.g., Euclidean distance < 400mm) to form a single cluster
        Update required statistics
        Retain this cluster if its final size > a, otherwise discard it
    ENDIF
ENDFOR
```

Cluster processing can further incorporate or be supplemented by temporal filtering, which operates as a mechanism for ensuring some minimum persistence or temporal qualification of object detection events. By requiring such temporal consistency, possible intrusions into the protection zone can be distinguished from a noisy/temporary observation. That is, detected clusters (merged or otherwise) that meet the minimum object size may be validated by confirming their persistence over time. The IEC 61494-3 standard (and draft standard IEC-61496-4-3) specifies that the maximum speed at which a person can approach a protection zone (by walking/running) is bounded by 1.6 m/s. The maximum speed for a person crawling on the floor, however, is only 0.8 m/s as described earlier herein.

Within the context of this disclosure, these guidelines are used to establish a correspondence between clusters found at current frame $F_t$ and the previous frame at $F_{t-1}$. The threshold for temporal association, $d_{th}$, is a function of the sensor head configuration (e.g., optics, imager resolution, frame rate, etc.). The algorithm for temporal validation is summarized below:

```
Input: List of clusters in frames F_t... F_{t-n}, where n is a filtering period that
    is preconfigured or dynamically selected; filtering parameter m,
    for m out of n filtering (where the subscript denotes the time stamp
    of the frame)
Output: Boolean Intrusion status - true if detected
Let F_t denote the frame at time t.
For any cluster c in frame F_t
    1. Set the current cluster k = c.
    2. Set nskip = n - m, lastMatch = 1
    3. For F_p in F_{t-1} to F_{t-n}
        a. Find nearest cluster, j, in frame F_p, to the current cluster k
        b. If distance between clusters j and k, D(j, k) < lastMatch*
            d_{th} then set k = j and lastMatch = 1
        c. Else set nskip = nskip - 1, lastMatch = lastMatch + 1
    4. If nskip > 0, then return true
    5. Otherwise, return false
```

Application of the connected component algorithm to noisy range data may result in inconsistent clustering of large objects from one frame to the next. Occasionally, a large cluster may split into multiple small clusters or vice versa. Temporal consistency requirements may be violated in cases where splitting and merging changes the cluster centroid positions from one frame to the next. Therefore, an embodiment of the validation algorithm contemplated herein further analyzes the clusters to check if they are a result of multiple clusters merging or a big cluster splitting in the previous frame. If a split/merge scenario is detected, then a cluster is deemed valid irrespective of the results of temporal consistency check.

Figure 12A:
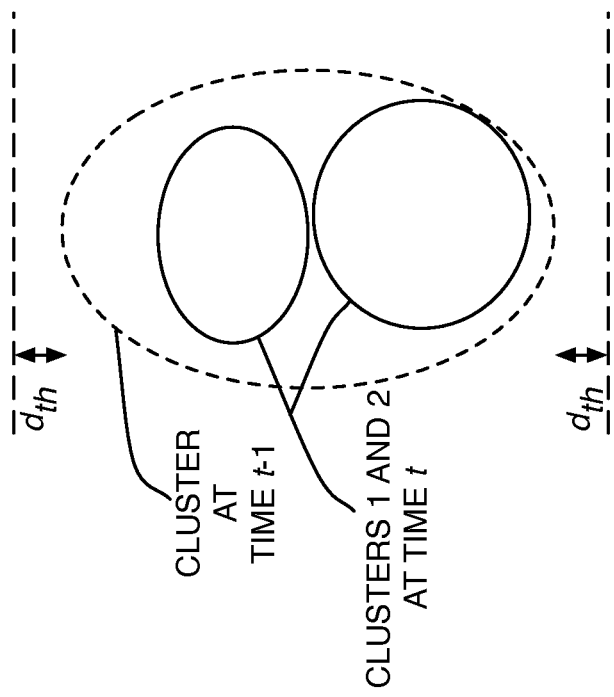
FIGS. 12A and 12B are diagrams illustrating one embodiment of evaluating cluster correspondence across image frames, based on evaluating the splitting or merging of clusters between image frames.
Figure 12B:
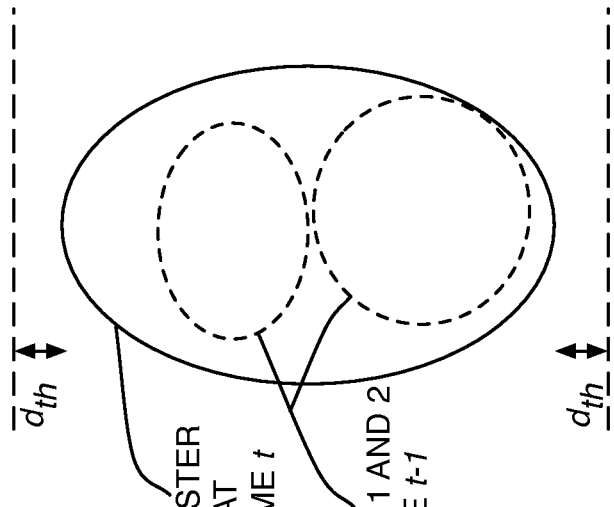

FIG. 12A illustrates a typical scenario where a cluster at time t−1 can split into two (or more) clusters at time t. Similarly, as shown in FIG. 12B, two or more clusters at time t−1 can combine/merge to form a single cluster at time t. The cluster split/merge test checks for the following two conditions:

a. Cluster split: Is the given (new) cluster at time t completely contained inside a bigger cluster (with tolerance for moving objects) at time t−1?
  b. Cluster merge: Does the given (new) cluster at time t, completely contain (with tolerance for moving objects) one or more of the clusters at time t−1?

For a cluster to be a valid either of the above conditions should be true, or the cluster should pass the temporal consistency test. These tests are performed by the image processing circuits 36 to establish correspondence in at least m out of the previous n frames.

Figure 13:
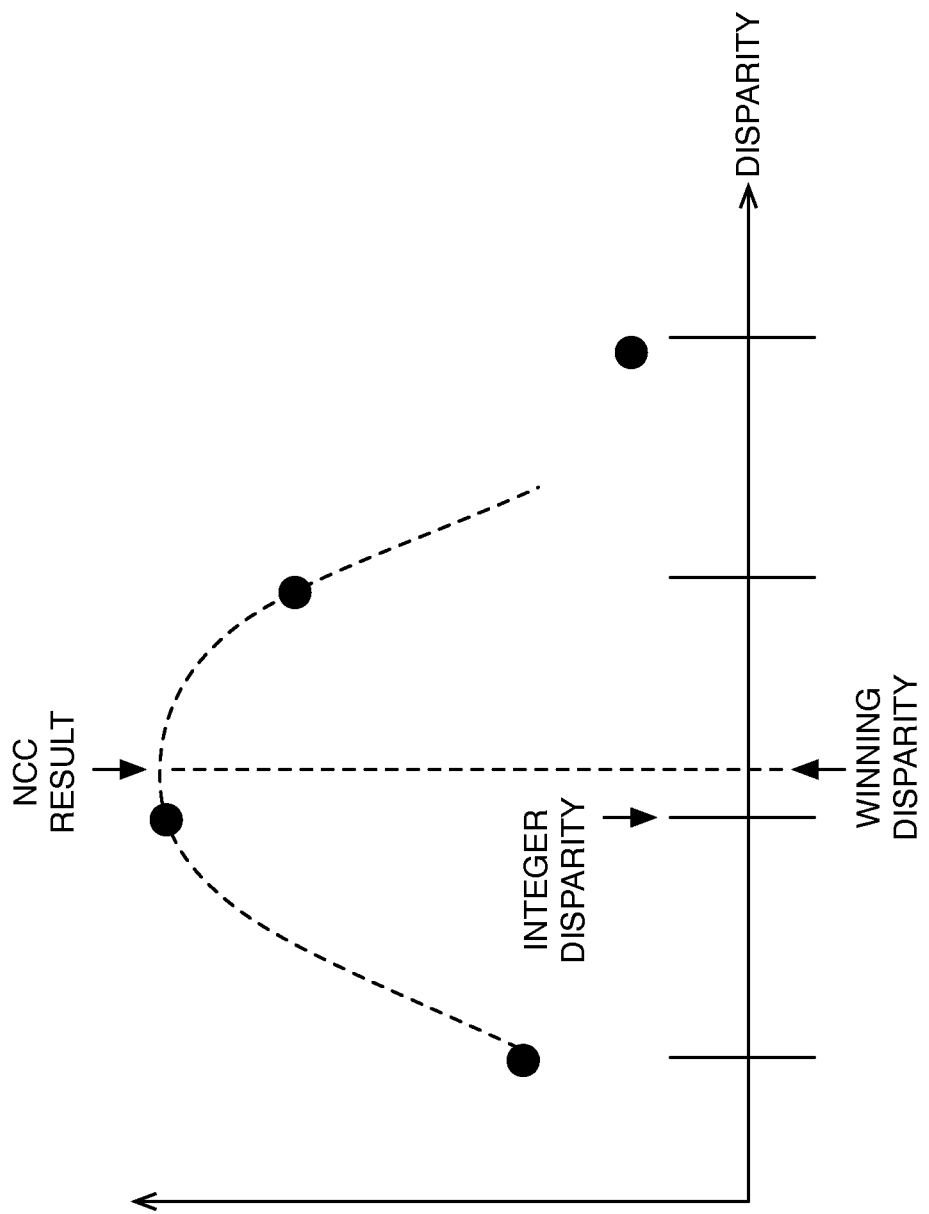
FIG. 13 is a plot illustrating an example of disparity detection based on normalized cross-correlation of a stereo image.

In the same or other embodiments, further processing provides additional suppression of false positives. In an example of such additional processing, the image processing circuits 36 are configured to subject the range pixels detected as being inside the protection zone boundary an NCC-based verification step, resulting in the disparity-based qualification depicted in FIG. 13.

In the context of NCC-based verification the following notation may be used:

L(x, y) denotes the intensity value of the left image pixel at x column and y row.

R(x, y) denotes the intensity value of the right image pixel at x column and y row.

L' is the average intensity of the specified NCC window from left image.

R' is the average intensity of the specified NCC window from right image.

Further, the NCC-based "scoring" may be mathematically represented as follows:

$$NccScore(L(x, y), R(k, l)) = \frac{\sum_{(i,j) \in NCCWindow} L(x+i, y+j) R(k+i, l+j)}{\sqrt{\sum_{(i,j) \in NCCWindow} L(x+i, y+j)^2 \sum_{(i,j) \in NCCWindow} R(k+i, l+j)^2}}$$

In this context, example pseudo-code for NCC range verification is as follows:

```
Input: Left rectified image, L(x,y), Right rectified image, R(x,y), and
depth map Z(x,y)
Output: Updated depth map, Z(x,y).
FOR each pixel inside protection zones
    Calculate disparity (dspty) from depth map at x, y
    Round down dspty to the nearest integer
    Calculate the NCC score (nsc1) for NccScore(L(x, y),
        R(x-dspty-1, y))
    Calculate the NCC score (nsc2) for NccScore(L(x, y),
        R(x-dspty , y))
    Calculate the NCC score (nsc3) for NccScore(L(x, y),
        R(x-dspty+1, y))
    Calculate the NCC score (nsc4) for NccScore(L(x, y),
        R(x-dspty+2, y))
    STORE the maximum of nsc1, nsc2, nsc3, nsc4 in max_nsc
    STORE the disparity of right image corresponding to max_nsc
        in max_dspty
    IF max_nsc equals to nsc1 OR max_nsc equals to nsc4 THEN
        Set depth map at x, y to zero
        CONTINUE
    ENDIF
    Use parabola fitting to interpolate the NCC sub-pixel disparity
        with max_nsc, and the two NCC scores
        corresponding to max_dspty+/-1
    STORE the NCC sub-pixel disparity in depth map at x, y
ENDFOR
```

In a further aspect, the image processing circuits 36 in one or more embodiments are configured to carry out epipolar error suppression. An example implementation of epipolar error suppression includes four primary steps: (1) edge detection, (2) edge magnitude and orientation estimation, (3) compute statistics from edge magnitude and orientation values to flag low confidence pixels, and (4) cluster suppression.

Various approaches to edge detection are possible. In one example, the image processing circuits 36 are configured to carry out the processing represented by the below mathematical expressions:

$$H(i, j) = h \otimes I = \sum_{n=-W}^{W} \sum_{m=-W}^{W} I(i+m, j+n) \cdot h(m, n)$$

$$V(i, j) = v \otimes I = \sum_{n=-W}^{W} \sum_{m=-W}^{W} I(i+m, j+n) \cdot v(m, n)$$

where $$h = \begin{bmatrix} 1 & 2 & 1 \\ 0 & 0 & 0 \\ -1 & -2 & -1 \end{bmatrix} \text{ and } v = \begin{bmatrix} 1 & 0 & -1 \\ 2 & 0 & -2 \\ 1 & 0 & -1 \end{bmatrix}$$

and

I is the left rectified image for the stereo image pair being processed.

Similarly, various approaches are available for estimating edge orientation. In an example configuration, the image processing circuits 36 estimate edge orientation based on the below mathematical expressions:

$$\Theta(x, y) = \tan^{-1} \frac{V(x, y)}{H(x, y)},$$

where $\Theta$ denotes the edge orientation map and M denotes the edge magnitude map, such that $$M(x,y) = \sqrt{(V(x,y)^2 + H(x,y)^2}.$$

The above estimates support calculation of the mean and standard deviation amplitude-angle product for pixel suppression. In an example embodiment, the algorithm for such processing is implemented in the image processing circuits 36 is as follows:

```
Input: Edge orientation map, Θ; Edge magnitude map, M.
Output: Count of unsuppressed pixels per projection space cell.
FOR each pixel inside the protection zone
    Calculate Mean of M*Θ for (NCC_WINSIZE x NCC_WINSIZE)
        neighboring pixels
    Calculate Standard Deviation, STD, of M*Θ for
        (NCC_WINSIZE x NCC_WINSIZE) neighboring pixels
    IF Mean is greater than Mean threshold OR STD is greater
        than STD threshold
        THEN
            STORE cell index of this pixel in cell_id
            inside_pixel_count[cell_id]++
    ENDIF
ENDFOR
```

At this point, the image processing circuits 36 have a basis for performing cluster suppression. An example algorithm for cluster image processing is below.

```
Input: Count of unsuppressed pixels per projection space cell
Output: Final cluster list, after suppression
FOR each cluster
    FOR each cell in this cluster
        Calculate the sum of inside_pixel_count within 3x3
            neighboring window
        Keep the maximum sum in max_sum
    ENDFOR
    IF max_sum is less than the sum of inside_pixel_count threshold
        THEN
            Delete this cluster
    ENDIF
ENDFOR
```

The above-detailed cluster-based processing implemented in one or more embodiments of the image processing circuits 36 relate directly to the size of the minimum detectable test object and demonstrate that the chosen thresholds are commensurate with the desired detection capability of the apparatus. It is also useful to look at such processing from the perspective of the various object detection parameters associated with the depth maps generated by the image processor circuits 402 or elsewhere in the image processing circuits 36. The object detection thresholds can be categorized as follows:

Quantization thresholds:
$\Delta\theta$: Angular quantization for HFOV (horizontal field-of-view)
$\Delta\phi$: Angular quantization for VFOV (vertical field-of-view)
E.g., For a FOV of 64°×44° and the angular quantization of (0.5°×0.5°) there will be a total of 128×88 cells in the quantized spherical histogram Clustering Threshold
$T_{pix}$: Minimum number of pixels/rays a cell must have to qualify for clustering (depends on FOV, imager resolution, minimum sized object, etc.)
$T_{cells}$: Minimum number of cells a cluster must have to qualify for filtering (depends on FOV, imager resolution, min. sized object etc.)
Note: This threshold can be made dependent on the total number of pixels per cluster also (e.g., lower $T_{cells}$ if the sum of $T_{pix}$ is higher in cells—this dependency can be useful for directional lighting cases)

Figure 14:
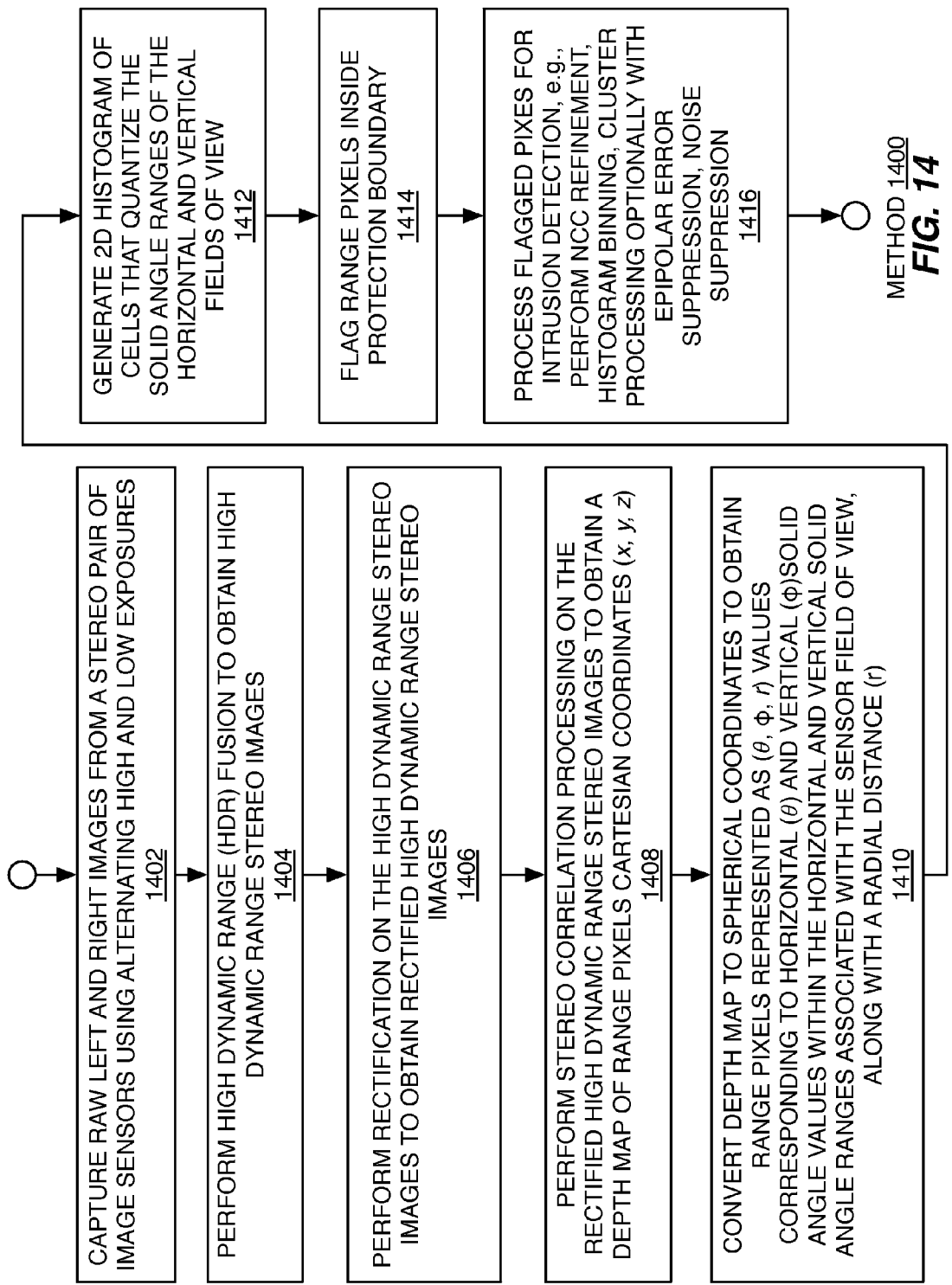
FIG. 14 is a logic flow diagram of one embodiment of image processing and corresponding object intrusion detection, as contemplated herein.

Temporal Filtering threshold
$N_{filt}$: Number of image frames over which to filter the detection results FIG. 14 illustrates the above processing in an example flow diagram, using example processing steps 1402-1416 (even), wherein the illustrated steps include: capturing raw left and right images from a stereo pair of image sensors 18 using alternating high and low exposures; and fusing corresponding ones of the high and low exposure images from each such sensor 18 to obtain HDR stereo images, which are then rectified to obtain rectified HDR stereo images.

The illustrated processing further includes performing stereo correlation processing on the HDR stereo images, to obtain depth maps of range pixels in Cartesian coordinates. It will be understood that a new depth map can be generated at each (HDR) image frame—i.e., upon the capture/generation of each new rectified HDR stereo image. Such depth maps are processed by converting them into spherical coordinates representing the projective space of the sensor field-of-view 14. The range pixels inside the defined protection boundary (which may be defined as a set of radial distances for solid angle values or subranges within the projective space that define a boundary, surface or other contour) are flagged.

Processing continues on the flagged pixels, which also may include mitigation pixels flagged as being unreliable or bad. Such processing includes, for example NCC correction, histogramming (binning the flagged pixels into respective cells that quantize the horizontal and solid angle ranges spanned by the sensor field of view 14), epipolar error suppression, noise filtering, etc.

As an example of the thresholds used in the above processing, such thresholds are derived or otherwise established in context of the following assumptions:

Optics and Imager
FOV: 64°H×44° V, where "H" and "V" denote horizontal and vertical (although the teachings and processing apply herein equally to other frames of reference)
Imager resolution: 740×468
Focal length (f): 609.384 pixels
Minimum object size: 200 mm diameter The projection histogram thresholds for developing the 2D histogram data from the depth map are set as:
Solid angle range quantization: $(\Delta\theta, \Delta\phi)=(0.5, 0.5)$, which can be understood as defining histogram cells corresponding to these angular quantizations
Cell dimensions=128×88
Max pixels/rays per cell
$-(740/128)\times(468/88)\sim=5\times5$ pixels With the above quantization parameters, the number of cells occupied in the projection histogram by the worst-case object at maximum range can be calculated as:

Projection of 200 mm test object at 8 m is—200/(8000/f)=200/(8000/609.384)~=15×15 pixels~=3×3 cells.

Finally, the clustering thresholds are selected to permit detection of even a partially occluded worst-case object. It should be noted that in at least one embodiment of the detection approach taught herein, unreliable faulty pixels, shadowing object projections, etc., will also have a contribution to the projection histogram (i.e., there is no need to keep an additional margin for such errors). In other words, the conservative tolerances here are just an additional safety precaution.

In an example of clustering thresholds, the image processing circuits 36 may be configured as follows:
Require at least 25% occupancy of each cell for it to qualify for clustering (an object may not be perfectly aligned with the grid; in the worst case, it may occupy a 4×4 grid, with only a small occupancy for border cells).
Hence Tpix=6
To allow for occlusions up to half the object size, require a minimum number of clusters to be 50% of total occupancy (3×3 cells); again, note that this requirement is conservative as it is on top of the shadowing object pixels that have already been flagged.
Hence Tcells=4

It should be understood that the above thresholds serve as examples illustrating the application of the clustering threshold concept. The values of these thresholds relate to the detection capability and sensing resolution of the apparatus 10. Thus, the parameters may be different for different optical configurations, or a slightly different set of parameters may be used if a different implementation is chosen.

Figure 15:
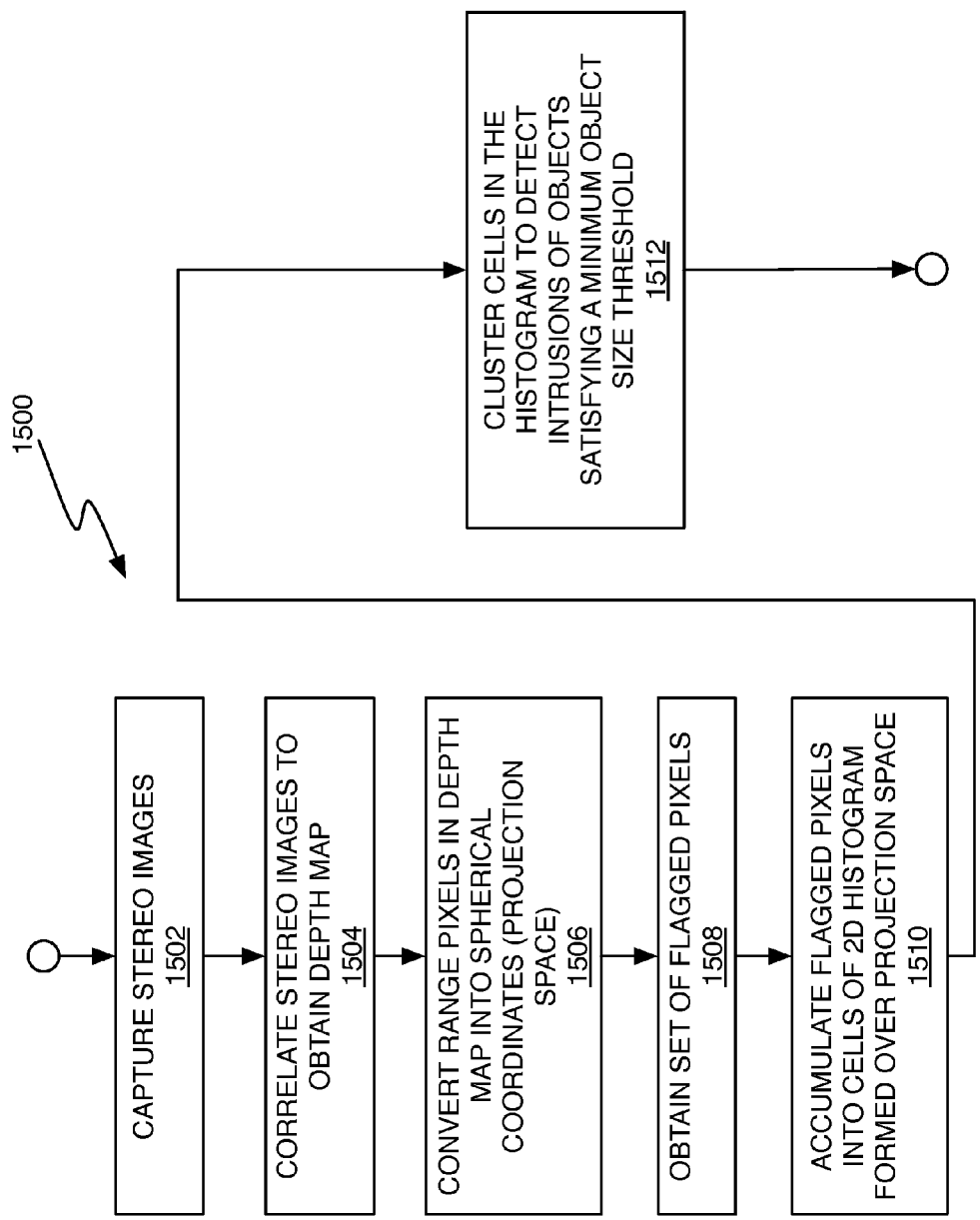
FIG. 15 is a logic flow diagram of another embodiment of image processing and corresponding object intrusion detection, and may be understood as an advantageous generalization of the logic flow of FIG. 14.

With the above in mind, a method 1500 is illustrated in FIG. 15, as an example of the generalized method of image processing and corresponding object intrusion detection as contemplated herein. It will be understood that the method 1500 may cover the processing depicted in FIG. 14 and in any case represents a specific configuration of the image processing circuits 36, e.g., a programmatic configuration.

The method 1500 comprises capturing stereo images from a pair of image sensors 18 (Block 1502). Here, the stereo images may be raw images, each comprising a set of pixels spanning corresponding horizontal and vertical fields of view (as defined by the solid angles spanned by the image sensors' field-of-view 14. Preferably, however, the stereo images are rectified, high dynamic range stereo images, e.g., they are processed in advance of correlation processing. It will also be understood that in one or more embodiments, a new stereo image is captured in each of a number of image frames, and at least some of the processing in FIG. 15 may be applied to and across successive stereo images.

In any case, processing in the method 1500 continues with correlating the (captured) stereo images, to obtain a depth map comprising range pixels represented in three-dimensional Cartesian coordinates (Block 1504), and converting the range pixels into spherical coordinates (Block 1506). As a consequence of this conversion, each range pixel is represented in spherical coordinates, e.g., as a radial distance along a respective pixel ray and a corresponding pair of solid angle values within the horizontal and vertical fields of view associated with capturing the stereo images.

As noted earlier herein, there are advantages to representing the range pixels using the same projective space coordinate system applicable to the image sensors 18 used to capture the stereo images. With the range pixels represented in spherical coordinates, processing continues with obtaining a set of flagged pixels, by flagging those range pixels that fall within a protection boundary defined for a monitoring zone 12 (Block 1508). In other words, a known, defined protection boundary is represented in terms of radial distances corresponding to the various pixel positions and the radial distance determined for the range pixels at each pixel position is compared to the radial distance of the protection boundary at that pixel position. Range pixels inside the protection boundary are flagged.

Processing then continues with accumulating the flagged pixels into corresponding cells of a two-dimensional histogram that quantizes the solid angle ranges of the horizontal and vertical fields of view (Block 1510). In an example case, the solid angle spanned horizontally by the sensor field of view 14 is equally subdivided, and the same is done for the solid angle spanned vertically by the sensor field of view 14, thereby forming a grid of cells, each cell representing a region within the projective space spanned by the ranges of solid angles spanned by the cell. Thus, the image processing circuits 36 determine whether a given one of the flagged range pixels falls into a given cell in the histogram by comparing the solid angle values of the flagged range pixel with the solid angle ranges of the cell.

Of course, given that mitigation pixels also are included in the set of flagged pixels in one or more embodiments, it will be understood that mitigation pixels are similarly accumulated into cells of the histogram. Thus, the pixel count for a given cell in the histogram represents range pixels that fell into that cell, mitigation pixels that fell into the cell, or a mix of both range and mitigation pixels that fell into the cell.

After accumulation, processing continues with clustering cells in the histogram to detect intrusions of objects within the protection boundary that meet a minimum object size threshold (Block 1512). In this regard, it will be understood that the image processing circuits 36 will use a known relationship between cell size (in solid angle ranges) and the minimum object size threshold, to identify clusters of cells that are qualified in the sense that they satisfy the minimum object size threshold. Of course, additional processing may be applied to qualified clusters, such as temporal filtering to distinguish between noise-induced clusters versus actual object intrusions.

In some embodiments, the method 1500 clusters cells in the histogram by identifying qualified cells as those cells that accumulated at least a minimum number of the flagged pixels, and identifying qualified clusters as those clusters of qualified cells that meet a minimum cluster size corresponding to the minimum object size threshold. In other words, a cell is not considered as a candidate for clustering unless it accumulated some minimum number of the flagged pixels, and a cluster of qualified cells is not deemed to be a qualified cluster unless it has a number of cells satisfying the minimum object size threshold.

In at least one example, clustering cells in the histogram further comprises determining whether any qualified clusters persist for a defined window of time and, if so, determining that an object intrusion has occurred. This processing is an example of temporal filtering, which may be considered as part of cluster processing or may be considered as a post-processing operation applied to the qualified clusters detected in each of a number of image frames.

For example, in one implementation, qualified clusters are identified for the stereo image captured in each image frame in which one of the stereo images is captured, and the method 1500 includes filtering qualified clusters over time by determining whether a same qualified cluster persists over a defined number of image frames and, if so, determining that an object intrusion has occurred. Such processing can be understood as evaluating the correspondence between the qualified clusters detected in the stereo image as captured in one image frame with the qualified clusters detected in the stereo images captured in one or more preceding or succeeding image frames. If the same qualified cluster—optionally, a tolerance is applied so that "same" does not necessarily mean "identical" in terms of cell membership—is detected over some number of image frames, it is persistent and corresponds to an actual object intrusion rather than noise.

In a further aspect of filtering, the method 1500 includes determining whether equivalent qualified clusters persist over the defined number of image frames and, if so, determining that an object intrusion has occurred. Here, "equivalent" qualified clusters are those qualified clusters that split or merge within a same region (same overall group of cells) of the histogram over the defined number of image frames. Thus, two qualified clusters detected in the stereo image of one frame may be considered equivalent to a single qualified cluster detected in a preceding or succeeding frame if all such clusters involve the same cells in the histogram. Again, a tolerance may be applied, so that "same" does not necessarily mean identicality of cells for the split or merged clusters.

In another aspect of the method 1500, and one that yields a host of advantages in terms of meeting safety-of-design requirements or other fail-safe requirements, the method 1500 includes generating one or more sets of mitigation pixels from the stereo images, wherein the mitigation pixels represent pixels in the stereo images that are flagged as being faulty or unreliable. The method 1500 further includes integrating the one or more sets of mitigation pixels into the set of flagged pixels for use in clustering, so that any given qualified cluster detected during clustering comprises range pixels flagged based on range detection processing or mitigation pixels flagged based on fault detection processing, or a mixture of both.

Generating the one or more sets of mitigation pixels comprises detecting at least one of: pixels in the stereo images that are stuck; pixels in the stereo images that are noisy; and pixels in the stereo images that are identified as corresponding to shadowed regions of the monitoring zone 12. Such processing, as the name implies, effectively mitigates the safety-critical detection issues that would otherwise arise if unreliable (e.g., because of shadowing) or otherwise bad pixels were ignored or used without compensation. Instead, with the contemplated mitigations, bad or unreliable pixels simply get swept into the set of flagged pixels used in cluster processing, meaning that they are treated the same as range pixels that are flagged as being inside the defined protection boundary.

There are other advantageous aspects of the contemplated image processing that enhances accuracy and reliability. In an example case, the stereo images are rectified such that they correspond to an epipolar geometry. Such processing is done in advance of stereo correlation processing, thereby correcting epipolar errors before performing correlation processing.

In a further extension of such enhancements, the stereo images are captured as corresponding high exposure and low exposure stereo images and the high dynamic range stereo images are formed from the corresponding high and low exposure stereo images. Here, "high" and "low" exposures are defined in a relative sense, meaning that high exposure images have a longer exposure time than low exposure images. Rectification is then performed on the high dynamic range stereo images, so that correlation processing is performed on the rectified high dynamic range stereo images.

In this regard, it is recognized herein that consistency in geometric correspondence between the mitigation pixels and the range pixels is advantageously preserved by performing mitigation processing on the same rectified high dynamic range stereo images as used for depth map generation (stereo correlation processing). Thus, one or more embodiments of the method 1500 include flagging bad or unreliable pixels in the rectified high dynamic range stereo images as mitigation pixels, and further comprising adding the mitigation pixels to the set of flagged pixels, such that clustering considers both the range pixels and the mitigation pixels.

In a further, related embodiment, the method 1500 includes evaluating intensity statistics for the high dynamic range stereo images or for the rectified high dynamic range stereo images. Correspondingly, the method 1500 includes controlling exposure timing used for capturing the low and high exposure stereo images as a function of the intensity statistics.

Still further, in at least one embodiment, the method 1500 includes capturing the stereo image as a first stereo image using a first pair of image sensors 18 operating with a first baseline, and further comprises capturing a redundant second stereo image using a second pair of image sensors 18 operating with a second baseline. Correspondingly, the method steps of correlating 1504 (Block 1504), converting (Block 1506), obtaining (Block 1508), accumulating (Block 1510) and clustering (Block 1512) are performed independently for the first and second stereo images, and deciding that an object intrusion has occurred only if clustering for each of the first and second stereo images both detect the same object intrusion.

Of further note and with momentary reference back to FIG. 2, the apparatus 10 may be configured to implement the above processing with respect to a first pair of image sensors 18-1 and 18-2 operating on a first primary baseline 32-1, and a second pair of image sensors 18-3 and 18-4 operating on a second primary baseline 32-2. In at least some embodiments, these first and second pairs of image sensors 18 view the same scene and therefore capture redundant pairs of stereo images.

In such embodiments, the image processing circuits 36 are configured to capture a first stereo image in one or more image frames using the first pair of image sensors 18-1 and 18-2 operating with a first baseline 32-1, and to capture a redundant second stereo image in the one or more image frames using a second pair of image sensors 18-3 and 18-4 operating with a second baseline 32-2. The image processing circuits 36 are further configured to perform the earlier-described steps of correlating the stereo image to obtain a depth map, converting the depth map into spherical coordinates, obtaining a set of flagged pixels, accumulating flagged pixels in the (2D) histogram, and clustering histogram cells for object detection, independently for the first and second stereo images.

Such an approach yields cluster-based object detection results for the first stereo images and cluster-based object detection results for the second stereo images. Thus, the logical act of deciding that an actual object intrusion has occurred may be made more sophisticated by evaluating the correspondence between object detection results obtained for the first stereo images and those obtained for the second stereo images. In an example configuration, the image processing circuits 36 decide that an object intrusion has occurred if there is a threshold level of correspondence between object intrusions detected with respect to the first stereo images and object intrusions detected with respect to the second stereo images.

Broadly, the image processing circuits 36 may be configured to use a voting-based approach, where the object detection results obtained for the first and second baselines 32-1 and 32-2 do not have to agree exactly, but do have to satisfy some minimum level of agreement. For example, the image processing circuits 36 may decide that an actual object intrusion has occurred if the intrusion was detected, e.g., eight out of twelve detection cycles (six detection cycles for each baseline 32-1 and 32-2).

Notably, modifications and other embodiments of the disclosed invention(s) will come to mind to one skilled in the art having the benefit of the teachings presented in the foregoing descriptions and the associated drawings. Therefore, it is to be understood that the invention(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

What is claimed is:

1. A method of detecting objects intruding into a monitoring zone, said method performed by a projective volume monitoring apparatus and comprising:

capturing a stereo image from a pair of image sensors;
correlating the stereo image to obtain a depth map comprising range pixels represented in three-dimensional Cartesian coordinates;
converting the range pixels into spherical coordinates, so that each range pixel is represented as a radial distance along a respective pixel ray and a corresponding pair of solid angle values within the horizontal and vertical fields of view associated with capturing the stereo image;
obtaining a set of flagged pixels by flagging those range pixels that fall within a protection boundary defined for the monitoring zone;
accumulating the flagged pixels into corresponding cells of a two-dimensional histogram that quantizes the solid angle ranges of the horizontal and vertical fields of view; and
clustering cells in the histogram to detect intrusions of objects within the protection boundary that meet a minimum object size threshold.

2. The method of claim 1, wherein clustering cells in the histogram comprises identifying qualified cells as those cells that accumulated at least a minimum number of the flagged pixels, and identifying qualified clusters as those clusters of qualified cells that meet a minimum cluster size corresponding to the minimum object size threshold.

3. The method of claim 2, wherein clustering cells in the histogram further comprises determining whether any qualified clusters persist for a defined window of time and, if so, determining that an object intrusion has occurred.

4. The method of claim 2, wherein qualified clusters are identified for the stereo image captured in each of a number of successive image frames, and further comprising filtering the qualified clusters over time by determining whether a same qualified cluster persists over a defined number of image frames and, if so, determining that an object intrusion has occurred.

5. The method of claim 4, wherein filtering the qualified clusters over time further includes determining whether equivalent qualified clusters persist over the defined number of image frames and, if so, determining that an object intrusion has occurred, wherein equivalent qualified clusters are those qualified clusters that split or merge within a same region of the histogram over the defined number of image frames.

6. The method of claim 1, further comprising generating one or more sets of mitigation pixels from the stereo image, wherein the mitigation pixels represent pixels in the stereo image that are flagged as being faulty or unreliable, and integrating the one or more sets of mitigation pixels into the set of flagged pixels for accumulation in corresponding cells of the histogram, along with the range pixels flagged for inclusion in the set of flagged pixels, so that any given cluster includes cells that accumulated range pixels, mitigation pixels, or a mix of both.

7. The method of claim 6, wherein generating the one or more sets of mitigation pixels comprises detecting at least one of: pixels in the stereo image that are outside of a usable dynamic range; pixels in the stereo image that are stuck; pixels in the stereo image that have reduced sensitivity; pixels in the stereo image that are noisy; and pixels in the stereo image that are identified as corresponding to shadowed regions of the monitoring zone.

8. The method of claim 1, wherein capturing the stereo image comprises capturing corresponding high exposure and low exposure stereo images and forming a high dynamic range stereo image from the corresponding high and low exposure stereo images, and further comprising obtaining a rectified high dynamic range stereo image by rectifying the high dynamic range stereo image, so that correlation processing is performed on the rectified high dynamic range stereo image.

9. The method of claim 8, further comprising flagging pixels in the rectified high dynamic range stereo image as mitigation pixels that are deemed bad or unreliable for range detection purposes, and further comprising adding the mitigation pixels to the set of flagged pixels, such that clustering considers both the range pixels and the mitigation pixels in the set of flagged pixels.

10. The method of claim 8, further comprising capturing the stereo image in each one of a number of image frames, and correspondingly obtaining a rectified high dynamic range stereo image in each such image frame, and controlling exposure timing used for capturing the low and high exposure stereo images in each image frame as a function of intensity statistics determined from the high dynamic range stereo images or from the rectified high dynamic range stereo images.

11. The method of claim 1, wherein capturing the stereo image comprises capturing a first stereo image in one or more image frames using a first pair of image sensors operating with a first baseline, and further comprising capturing a redundant second stereo image in the one or more image frames using a second pair of image sensors operating with a second baseline, and wherein said method steps of correlating, converting, obtaining, accumulating and clustering are performed independently for the first and second stereo images, and wherein the method further includes deciding that an object intrusion has occurred if there is a threshold level of correspondence between object intrusions detected with respect to the first stereo images and object intrusions detected with respect to the second stereo images.

12. The method of claim 1, further comprising suppressing false detection of objection intrusions by re-computing depth information at a higher reliability for the ranged pixels in the depth map that were flagged for inclusion in the set of flagged pixels and evaluating the recomputed depth information to verify that each range pixel in the set of flagged pixels falls within the protection boundary.

13. The method of claim 1, further comprising suppressing epipolar errors in the clusters to obtain error-corrected clusters.

14. The method of claim 1, where the monitoring zone comprises two overlapping protection zones defined by respective protection boundaries, and further comprising monitoring a first one of the overlapping protection zones using detection parameters configured for detecting persons walking or running and monitoring a second one of the overlapping protection zones using detection parameters configured for detecting crawling and prone persons.

15. The method of claim 1, wherein clustering cells in the histogram to detect intrusions of objects within the protection boundary that meet a minimum object size threshold includes temporally filtering detected clusters to distinguish between clusters arising from noise and clusters arising from object intrusions.

16. A projective volume monitoring apparatus configured to detect objects intruding into a monitoring zone, said projective volume monitoring apparatus comprising:
  image sensors configured to capture a stereo image; and
  image processing circuits operatively associated with the image sensors and configured to:
    correlate the stereo image to obtain a depth map comprising pixels represented in three-dimensional Cartesian coordinates;
    convert the range pixels into spherical coordinates, so that each range pixel is represented as a radial distance along a respective pixel ray and a corresponding pair of solid angle values within the horizontal and vertical fields of view associated with capturing the stereo image;
    obtain a set of flagged pixels by flagging those range pixels that fall within a protection boundary defined for the monitoring zone;
    accumulate the flagged pixels into corresponding cells of a two-dimensional histogram that quantizes the solid angle ranges of the horizontal and vertical fields of view; and
    cluster cells in the histogram to detect intrusions of objects within the protection boundary that meet a minimum object size threshold.

17. The projective volume monitoring apparatus of claim 16, wherein the image processing circuits are configured to cluster cells in the histogram by identifying qualified cells as those cells that accumulated at least a minimum number of the flagged pixels, and identifying qualified clusters as those clusters of qualified cells that meet a minimum cluster size corresponding to the minimum object size threshold.

18. The projective volume monitoring apparatus of claim 17, wherein the image processing circuits are configured to cluster cells in the histogram further by determining whether any qualified clusters persist for a defined window of time and, if so, determining that an object intrusion has occurred.

19. The projective volume monitoring apparatus of claim 17, wherein the image processing circuits are configured to identify qualified clusters for the stereo image captured in each of a number of successive image frames and to filter qualified clusters over time by determining whether a same qualified cluster persists over a defined number of image frames and, if so, determining that an object intrusion has occurred.

20. The projective volume monitoring apparatus of claim 19, wherein the image processing circuits are configured to filter qualified clusters over time further by determining whether equivalent qualified clusters persist over the defined number of image frames and, if so, determining that an object intrusion has occurred, wherein equivalent qualified clusters are those qualified clusters that split or merge within a same region of the histogram over the defined number of image frames.

21. The projective volume monitoring apparatus of claim 16, wherein the image processing circuits are configured to generate one or more sets of mitigation pixels from the stereo image, wherein the mitigation pixels represent pixels in the stereo image that are flagged as being faulty or unreliable, and integrate the one or more sets of mitigation pixels into the set of flagged pixels for accumulation in corresponding cells of the histogram, along with the range pixels flagged for inclusion in the set of flagged pixels, so that any given cluster includes cells that accumulated range pixels, mitigation pixels, or a mix of both.

22. The projective volume monitoring apparatus of claim 21, wherein the image processing circuits are configured to generate the one or more sets of mitigation pixels by detecting at least one of: pixels in the stereo image that are outside of a usable dynamic range; pixels in the stereo image that are stuck; pixels in the stereo image that have reduced sensitivity; pixels in the stereo image that are noisy; and pixels in the stereo image that are identified as corresponding to shadowed regions of the monitoring zone.

23. The projective volume monitoring apparatus of claim 22, wherein the image processing circuits are configured to capture the stereo image by capturing corresponding high exposure and low exposure stereo images and forming a high dynamic range stereo image from the corresponding high and low exposure stereo images, and further are configured to obtain a rectified high dynamic range stereo image by rectifying the high dynamic range stereo image, so that correlation processing is performed on the rectified high dynamic range stereo image.

24. The projective volume monitoring apparatus of claim 23, wherein the image processing circuits are configured to flag pixels in the rectified high dynamic range stereo image as mitigation pixels that are deemed bad or unreliable for range detection purposes, and further configured to add the mitigation pixels to the set of flagged pixels, such that the image processing circuits perform clustering in consideration of both the range pixels and the mitigation pixels in the flagged set of pixels.

25. The projective volume monitoring apparatus of claim 23, wherein the image processing circuits are configured to capture the stereo image in each one of a number of successive image frames and to correspondingly obtain a rectified high dynamic range stereo image in each such image frame, and to control exposure timing used for capturing the low and high exposure stereo images in each image frame as a function of intensity statistics determined from the high dynamic range stereo images or from the rectified high dynamic range stereo images.

26. The projective monitoring apparatus of claim 16, wherein the projective monitoring apparatus includes a first pair of image sensors operating with a first baseline to capture the stereo image as a first stereo image obtained in each of one or more image frames, and further includes a second pair of image sensors operating with a second baseline to capture a redundant, second stereo image in each of the one or more image frames, and wherein the image processing circuits are configured to process the first and second stereo images independently, and to decide that an object intrusion has occurred if there is a threshold level of correspondence between object intrusions detected with respect to the first stereo images and object intrusions detected with respect to the second stereo images.

27. The projective monitoring apparatus of claim 16, wherein the image processing circuits are configured to suppress false detection of objection intrusions by re-computing depth information at a higher reliability for the ranged pixels in the depth map that were flagged for inclusion in the set of flagged pixels and evaluating the recomputed depth information to verify that each range pixel in the set of flagged pixels falls within the protection boundary.

28. The projective monitoring apparatus of claim 16, wherein the image processing circuits are configured to suppress epipolar errors in the clusters to obtain error-corrected clusters.

29. The projective monitoring apparatus of claim 16, where the monitoring zone comprises two overlapping protection zones defined by respective protection boundaries, and wherein the image processing circuits are configured to monitor a first one of the overlapping protection zones using detection parameters configured for detecting persons walking or running and to monitor a second one of the overlapping protection zones using detection parameters configured for detecting crawling and prone persons.

30. The projective monitoring apparatus of claim 16, wherein the image processing circuits are configured to detect object intrusions based on being configured to cluster cells in the histogram, detect any clusters that meet a minimum object size threshold, and to decide that an object intrusion has occurred if any of the detected clusters persist over a defined window of time.

31. The projective volume monitoring apparatus of claim 16, wherein the projective volume monitoring apparatus includes a sensor unit including a pair of image sensors configured to capture the stereo image and further including the image processing circuits, and wherein the projective volume monitoring apparatus further includes a control unit that is configured to communicate with the sensor unit, said control unit including control circuitry that controls one or more output signals responsive to intrusion detection signaling from the sensor unit, and wherein the image processing circuits of the sensor unit are configured to generate the intrusion detection signaling responsive to the detection of intrusions of objects within the protection boundary that meet the minimum object size threshold.

* * * * *